US009149930B2

(12) United States Patent
Inazumi

(10) Patent No.: US 9,149,930 B2
(45) Date of Patent: Oct. 6, 2015

(54) CONTROL SYSTEM, PROGRAM, AND METHOD OF CONTROLLING MECHANICAL EQUIPMENT

(71) Applicant: Seiko Epson Corporation, Tokyo (JP)

(72) Inventor: Mitsuhiro Inazumi, Shiojiri (JP)

(73) Assignee: Seiko Epson Corporation (JP)

( * ) Notice: Subject to any disclaimer, the term of this patent is extended or adjusted under 35 U.S.C. 154(b) by 42 days.

(21) Appl. No.: 13/938,350

(22) Filed: Jul. 10, 2013

(65) Prior Publication Data
US 2014/0025205 A1 Jan. 23, 2014

(30) Foreign Application Priority Data

Jul. 20, 2012 (JP) .................................. 2012-161732

(51) Int. Cl.
B25J 9/16 (2006.01)
(52) U.S. Cl.
CPC .............. B25J 9/1633 (2013.01); B25J 9/1694 (2013.01); G05B 2219/39194 (2013.01); G05B 2219/39343 (2013.01); G05B 2219/40586 (2013.01)
(58) Field of Classification Search
CPC ............ B25J 13/00; B25J 13/02; B25J 13/08; B25J 9/16; B25J 9/1628; B25J 9/163; B25J 9/1633; B25J 9/1694; G01L 1/14; G01L 1/20; G06N 7/00; G05B 2219/39343; G05B 2219/40586; G05B 2219/39194
USPC ......................................................... 700/258
See application file for complete search history.

(56) References Cited

U.S. PATENT DOCUMENTS

| 4,906,907 | A | * | 3/1990 | Tsuchihashi et al. ..... 318/568.22 |
| 5,497,061 | A | | 3/1996 | Nonaka et al. |
| 5,814,959 | A | | 9/1998 | Nonaka et al. |
| 6,915,709 | B2 | | 7/2005 | Okada |
| 7,121,147 | B2 | | 10/2006 | Okada |
| 7,320,253 | B2 | | 1/2008 | Hanazawa et al. |
| 7,472,611 | B2 | | 1/2009 | Hanazawa et al. |
| 7,739,922 | B2 | | 6/2010 | Inamori |

(Continued)

FOREIGN PATENT DOCUMENTS

| EP | 1930131 A2 | 6/2008 |
| JP | 61-265294 | 11/1986 |

(Continued)

OTHER PUBLICATIONS

Extended European Search Report for Application No. EP 13 17 7026 dated Nov. 4, 2014 (6 pages).

Primary Examiner — Jerrah Edwards
Assistant Examiner — Tamara Weber
(74) Attorney, Agent, or Firm — Harness, Dickey & Pierce, P.L.C.

(57) ABSTRACT

A control system includes a force sensor that has a mechanical mechanism (e.g., an end effector) and N (N is an integer equal to or more than two) triaxial force sensor units, acquires unit output values to which values resulting from the mechanical mechanism have been added from the respective triaxial force sensor units of the N triaxial force sensor units, and outputs force sense values based on the unit output values, a force sense value corrector that corrects the force sense values based on the force sense values output by the force sensor, and a controller that performs control of mechanical equipment (e.g., a robot) including the mechanical mechanism based on the force sense values corrected in the force sense value corrector.

12 Claims, 31 Drawing Sheets

(56) References Cited

U.S. PATENT DOCUMENTS

| | | | |
|---|---|---|---|
| 8,065,060 B2 * | 11/2011 | Danko | 701/50 |
| 2008/0140257 A1 | 6/2008 | Sato et al. | |
| 2009/0212478 A1 * | 8/2009 | Murayama | 269/56 |
| 2011/0040407 A1 | 2/2011 | Lim et al. | |
| 2011/0257787 A1 | 10/2011 | Sato et al. | |
| 2012/0130538 A1 * | 5/2012 | Riener et al. | 700/245 |
| 2012/0144932 A1 * | 6/2012 | Ikebe et al. | 73/862.041 |

FOREIGN PATENT DOCUMENTS

| | | |
|---|---|---|
| JP | 04-176583 | 6/1992 |
| JP | 06-339885 | 12/1994 |
| JP | 07-012664 | 1/1995 |
| JP | 07-205075 | 8/1995 |
| JP | 3412236 | 3/2003 |
| JP | 2005-161507 A | 6/2005 |
| JP | 2005-315826 A | 11/2005 |
| JP | 2007-276112 A | 10/2007 |
| JP | 2008-142810 A | 6/2008 |
| JP | 2008-298580 A | 12/2008 |
| JP | 4267027 | 2/2009 |
| JP | 2009-074969 A | 4/2009 |
| JP | 2009-162599 A | 7/2009 |
| JP | 2009-257992 A | 11/2009 |
| JP | 2010-008427 A | 1/2010 |
| JP | 2010-185725 A | 8/2010 |
| JP | 4600445 | 10/2010 |
| JP | 2011-033607 A | 2/2011 |
| JP | 2011-080945 A | 4/2011 |
| JP | 2011-177838 A | 9/2011 |
| WO | WO-2009-088828 A1 | 7/2009 |

* cited by examiner

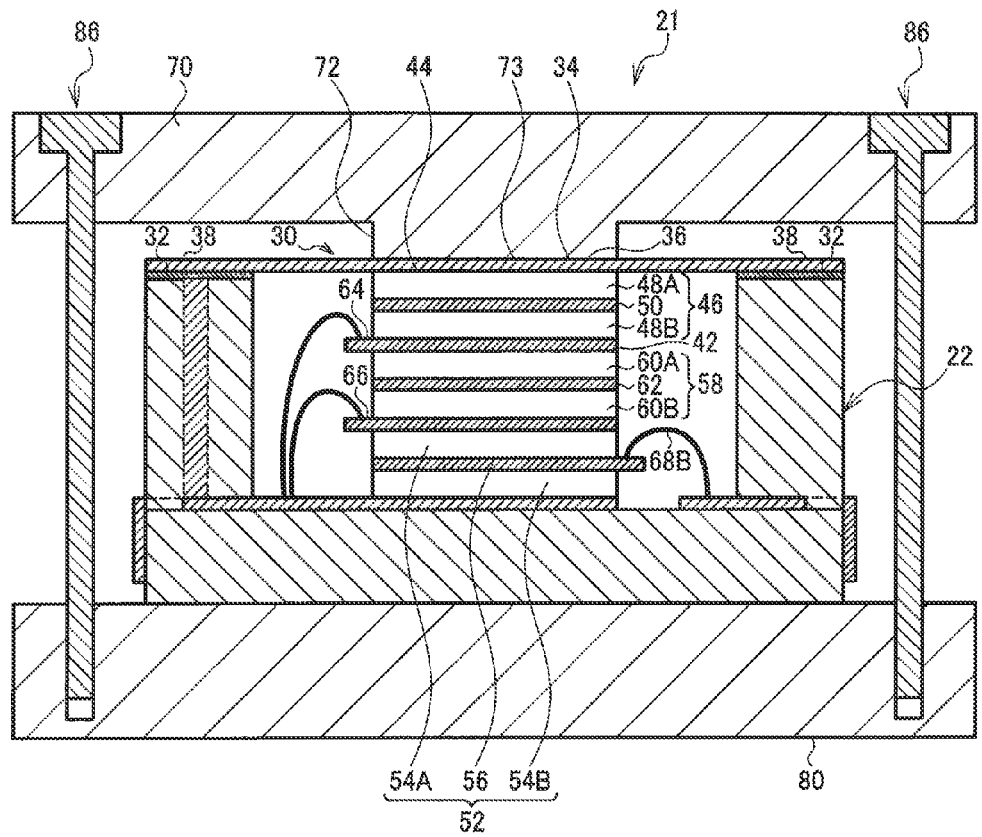

| | |
|---|---|
| 21 : SENSOR UNIT | 46 : FIRST SENSOR ELEMENT |
| 22 : SENSOR DEVICE | 52 : SECOND SENSOR ELEMENT |
| 30 : OPENING PART | 58 : THIRD SENSOR ELEMENT |
| 32 : END SURFACE (OUTER CIRCUMFERENCE SURFACE) | 70 : FIRST PLATE |
| 34 : SECOND MEMBER | 72 : FIRST PRESSING PART |
| 36 : FORCE TRANSMISSION PART | 73 : PRESSING SURFACE |
| 38 : EDGE PART | 80 : SECOND PLATE |
| 42 : SENSOR ELEMENT | 86 : FASTENING PART |
| 44 : PRESSURIZED SURFACE | 48, 54, 60 : QUARTZ PLATES |
| | 50, 56, 62 : DETECTION ELECTRODES |
| | 64, 66 : GROUND ELECTRODE |

FIG. 7

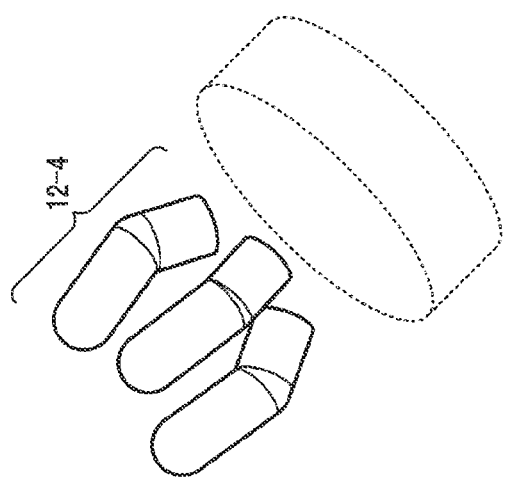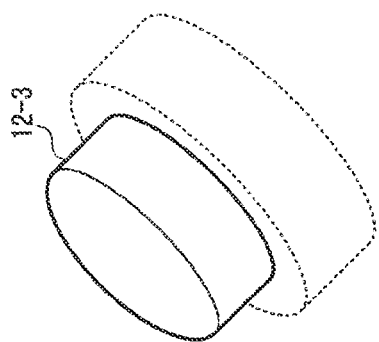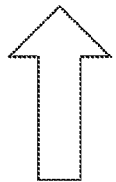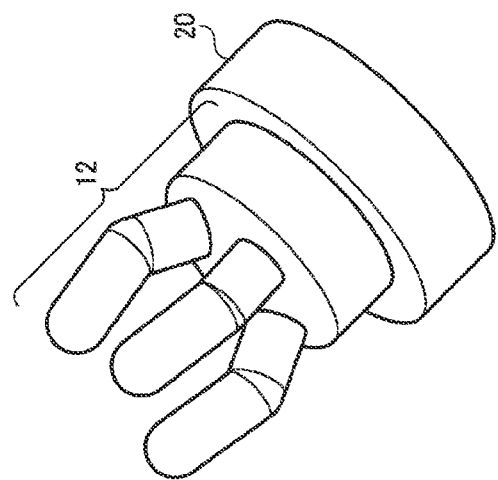
FIG.27

CONTROL SYSTEM, PROGRAM, AND METHOD OF CONTROLLING MECHANICAL EQUIPMENT

BACKGROUND

1. Technical Field

The present invention relates to a control system, a program, a method of controlling mechanical equipment, or the like.

2. Related Art

In work using a robot or the like, specific movements may be desired while not only locations but also forces are controlled. The force control may be used in the case where, for example, a soft object or a fragile object is handled without breakage, the case where an object surface having a complex shape is traced with a constant force, or other cases. In order to perform such force control, processing of detecting forces using a force sensor and incorporating magnitudes and directions of the forces into a control loop is necessary.

However, the force sensor detects not only external forces desired to be detected but also forces caused by the influences of finger structures attached thereto, forces from tools or work pieces grasped by the fingers, or the like. These forces are not constant, but change according to various conditions. Accordingly, it is difficult to separate the external forces desired to be detected and the forces from the finger structures and the tools or work pieces grasped by the fingers.

In this regard, JP-A-6-339885 discloses a technique for correcting a gyro effect due to a weight of the finger structures and its rotation. JP-A-6-339885 concerns the handling of a rotator such as perforating, burring, grinding, and polishing work using robots. Specifically, the moment that changes according to the arm position and the gyro effect generated by the rotator are corrected using the tool's center of gravity, the rotator's center of gravity, and the location of the contact point in the sensor coordinate system as given information, and a substantial external force is sensed.

Further, JP-A-2008-142810 discloses a technique for correcting the effect of centrifugal force or the like in addition to JP-A-6-339885. JP-A-2008-142810 corrects for the centrifugal force by the movement of the arm and correction processing is realized using the mass of the tool, location of the center of gravity, location of the arm, velocity, and acceleration detection units, and kinetic terms, in gravity computation units.

Furthermore, JP-A-2007-276112 discloses a technique for grasping and releasing an object by simply estimating an external force in the vertical direction rather than by the fine external force correction like JP-A-6-339885 and JP-A-2008-142810. JP-A-2007-276112 converts the force sensed by fingers from the hand coordinate system into the base coordinate system of the robot, and thereby, performs grasp control.

The techniques of JP-A-6-339885, JP-A-2008-142810 and JP-A-2007-276112 are based on the assumption that a physical model (for example, a weight distribution or the like) of a mechanical mechanism (including finger structures, or a tool grasped by the finger structures according to circumstances) are known. Accordingly, in the case where the physical model of the mechanical mechanism is unknown, the case where the physical model changes depending on the situation, or the like, it is difficult to appropriately correct for the influence on the force sense value by the mechanical mechanism (the detection value of the force sensor).

SUMMARY

An advantage of some aspects of the invention is to provide a control system, a program, a method of controlling mechanical equipment, or the like of appropriately correcting the influence on the force sensor by the mechanical mechanism when it is difficult to apply a known physical model to the mechanical mechanism.

An aspect of the invention relates to a control system including a mechanical mechanism, a force sensor that has N (N is an integer equal to or more than two) triaxial force sensor units, acquires unit output values to which values resulting from the mechanical mechanism have been added from the respective triaxial force sensor units of the N triaxial force sensor units, and outputs force sense values based on the unit output values, a force sense value corrector that corrects the force sense values based on the force sense values output by the force sensor, and a controller that performs control of mechanical equipment including the mechanical mechanism based on the force sense values corrected in the force sense value corrector.

In the aspect of the invention, the force sensor has the N triaxial force sensor units and performs correction processing according to the force sense values based on the unit output values output from the respective units. Here, N is equal to or more than two, and information in an amount equal to or more than that of a typical six-axial force sensor is output from the force sensor, and an improvement in the accuracy or the like may be realized compared to the correction processing using the force sense values of the six-axial force sensor.

In the aspect of the invention, the force sensor may output information containing the unit output values output from the respective triaxial force sensor units of the N triaxial force sensor units as the force sense values, and the force sense value corrector may estimate a location of the center of mass of the mechanical mechanism based on the unit output values contained in the force sense values, and perform the correction processing based on the estimated location of the center of mass.

Thereby, the correction processing using the location of the center of mass of the mechanical mechanism or the like may be performed.

In the aspect of the invention, the force sense value corrector may obtain N force vectors corresponding to forces respectively detected by the N triaxial force sensor units from the unit output values contained in the force sense values, estimate a mass of the mechanical mechanism based on a magnitude of a resultant vector of the obtained N force vectors, and perform the correction processing based on the estimated mass.

Thereby, the correction processing using the mass of the mechanical mechanism or the like may be performed.

In the aspect of the invention, the force sensor may have three or more triaxial force sensor units.

Thereby, the estimation of the location of the center of mass based on the force sense values or the like may be appropriately performed.

In the aspect of the invention, the force sensor may have four or more triaxial force sensor units.

Thereby, the estimation accuracy of the location of the center of mass or the like may be improved.

In the aspect of the invention, the force sensor may have at least two triaxial force sensor units, the force sense value corrector may perform processing of estimating the location of the center of mass of the mechanical mechanism according to first force sense values output from the force sensor based on the unit output values from the two triaxial force sensor units in a first position of the mechanical mechanism, the controller may perform control of changing the position of the mechanical equipment to a second position different from the first position if a determination that the estimation of the location of the center of mass is impossible has been made by the force sense value corrector, and, after the controller controls the mechanical equipment to be in the second position, the force sense value corrector may estimate the location of the center of mass of the mechanical mechanism according to second force sense values output from the force sensor based on the unit output values from the two triaxial force sensor units, and perform the correction processing based on the estimated location of the center of mass.

Thereby, a reduction in cost and the size of the force sensor or the like may be realized and, even when the number of triaxial force sensor units is two, appropriate estimation of the location of the center of mass or the like may be realized.

In the aspect of the invention, the force sense value corrector may estimate the location of the center of mass by obtaining a least squares solution of the location of the center of mass of the mechanical mechanism using a normalization equation.

Thereby, the location of the center of mass may be obtained as the least squares solution of the normalization equation.

In the aspect of the invention, the force sense value corrector may perform singular value decomposition on the normalization equation, and determine whether or not the estimation of the location of the center of mass is possible based on the number of singular values obtained by the singular value decomposition.

Thereby, a validity determination of the estimation result of the location of the center of mass or the like may be performed according to the number of singular values.

In the aspect of the invention, the force sensor may be a six-axial force sensor that acquires three values as the unit output values from the respective triaxial force sensor units of the N triaxial force sensor units, and thereby, acquires 3×N values, calculates translational forces Fx, Fy, Fz of the X-axis, Y-axis, and Z-axis and moment Mx, My, Mz around the respective axes based on the acquired 3×N values, and outputs information containing the calculated Fx, Fy, Fz and Mx, My, Mz as the force sense values.

Thereby, the force sensor having the N triaxial force sensor units may be used as a six-axial force sensor or the like as desired.

In the aspect of the invention, the force sense value corrector may perform the correction processing based on a plurality of the force sense values obtained in a plurality of the positions of the mechanical equipment.

Thereby, the improvement in the estimation accuracy of the location of the center of mass or the like may be realized.

In the aspect of the invention, a position information acquirer that acquires position information of a variable part of the mechanical mechanism may be provided, and the force sense value corrector may estimate the location of the center of mass of the variable part and perform the correction processing based on the position information of the variable part.

Thereby, even when the mechanical mechanism has the variable part, appropriate estimation of the location of the center of mass or the like may be performed.

In the aspect of the invention, the mechanical equipment may be a robot, the mechanical mechanism may be an end effector of the robot, the force sense value corrector may have N of the triaxial force sensor units, acquire the force sense values from the force sensor provided in correspondence with the end effector of the robot, and perform correction processing of the acquired force sense values, and the controller may perform control of the robot and the end effector based on the force sense values after the correction processing.

Thereby, when the robot is used as the mechanical equipment and the end effector is used as the mechanical mechanism, the control system that controls the robot or the like may be realized.

Another aspect of the invention relates to a program allowing a computer to function as a force sense value corrector that acquires force sense values from a force sensor provided in correspondence with a mechanical mechanism of mechanical equipment and performs correction processing of the force sense values, and a controller that performs control of the mechanical equipment and the mechanical mechanism based on the force sense values after the correction processing, wherein the force sensor has N (N is an integer equal to or more than two) triaxial force sensor units, and the force sense value corrector performs the correction processing according to the force sense values output from the force sensor based on unit output values from the N triaxial force sensor units.

In the another aspect of the invention, when the force sensor has the N triaxial force sensor units, a computer readable program for causing a computer to perform the correction processing on the force sense values from the force sensor and performing the appropriate control of the mechanical equipment and the mechanical mechanism based on the force sense values after the correction processing or the like may be realized.

Still another aspect of the invention relates to a method of controlling mechanical equipment including acquiring force sense values from a force sensor provided in correspondence with a mechanical mechanism of the mechanical equipment and having N (N is an integer equal to or more than two) triaxial force sensor units, performing correction processing on the acquired force sense values, performing control of the mechanical equipment and the mechanical mechanism based on the force sense values after the correction processing, and performing processing of correcting the force sense values as the correction processing according to the force sense values output from the force sensor based on unit output values from the N triaxial force sensor units.

In the still another aspect of the invention, when the force sensor has the N triaxial force sensor units, the control method of performing the correction processing on the force sense values from the force sensor and performing the appropriate control of the mechanical equipment and the mechanical mechanism based on the force sense values after the correction processing or the like may be realized.

BRIEF DESCRIPTION OF THE DRAWINGS

The invention will be described with reference to the accompanying drawings, wherein like numbers reference like elements.

FIG. 7 shows a configuration example of a triaxial force sensor unit.

FIG. 27 is a diagram for explanation of division of the mechanical mechanism into the fixed part and the variable part.

FIGS. 30A to 30C are explanatory diagrams of processing of obtaining amounts of correction for force sense values from the physical models, parameters, or the like.

DESCRIPTION OF EXEMPLARY EMBODIMENTS

Embodiments will be explained below. Note that the embodiments to be explained do not unduly limit the invention described in the appended claims. Further, all of the configurations to be explained in the embodiments are not necessarily essential structural elements of the invention.

1. Technique of Embodiments

First, a technique of the embodiments will be explained. In the related art, control using a force sensor or the like is performed in a lot of mechanical equipment. As the mechanical equipment, for example, a robot is considered and robot control is performed according to force sense values from the force sensor provided in the robot. Specifically, external forces acting on the mechanical mechanism of the robot (finger structures of a hand or the like in a narrow sense) are detected as force sense values, and thereby, force control such as impedance control may be performed.

Further, as mechanical equipment other than the robot, input equipment for power assist is considered, and rehabilitation equipment in medical fields or data recording equipment associated therewith is considered. In the rehabilitation application, information on the part of a patient and the magnitude of a force applied thereto is useful in treatment and diagnosis and there is a substantial need for appropriate control of the force applied from supporting equipment for power assist or the like to a user, and there are greater advantages in using the force sensor. Further, the mechanical equipment may be remotely operated equipment (including medical equipment) and, in this case, it is assumed that the force sense values from the force sensor are used for force sense feedback or the like. In addition, a force sense recorder used for scientific analysis of an artisan skill requiring a mature technique or the like may be the mechanical equipment of the embodiments, and input devices for toys, PCs, or the like may be the mechanical equipment of the embodiments. That is, various equipment may be assumed as the mechanical equipment of the embodiments.

In order to perform desired control, various correction processes may be desired for the force sense values of the force sensor. In the above described example of the robot that performs force control, a control system requires an external force actually acting on a part in contact with a work object. For example, in the case of control of grasping a given tool by a hand and sliding the tool on the surface of the work object (moving the tool without application of excessive force while preventing it from floating), it is necessary to detect a reaction force acting on the tool as an external force in response to the force of the tool pressing the work object.

Figure 1:
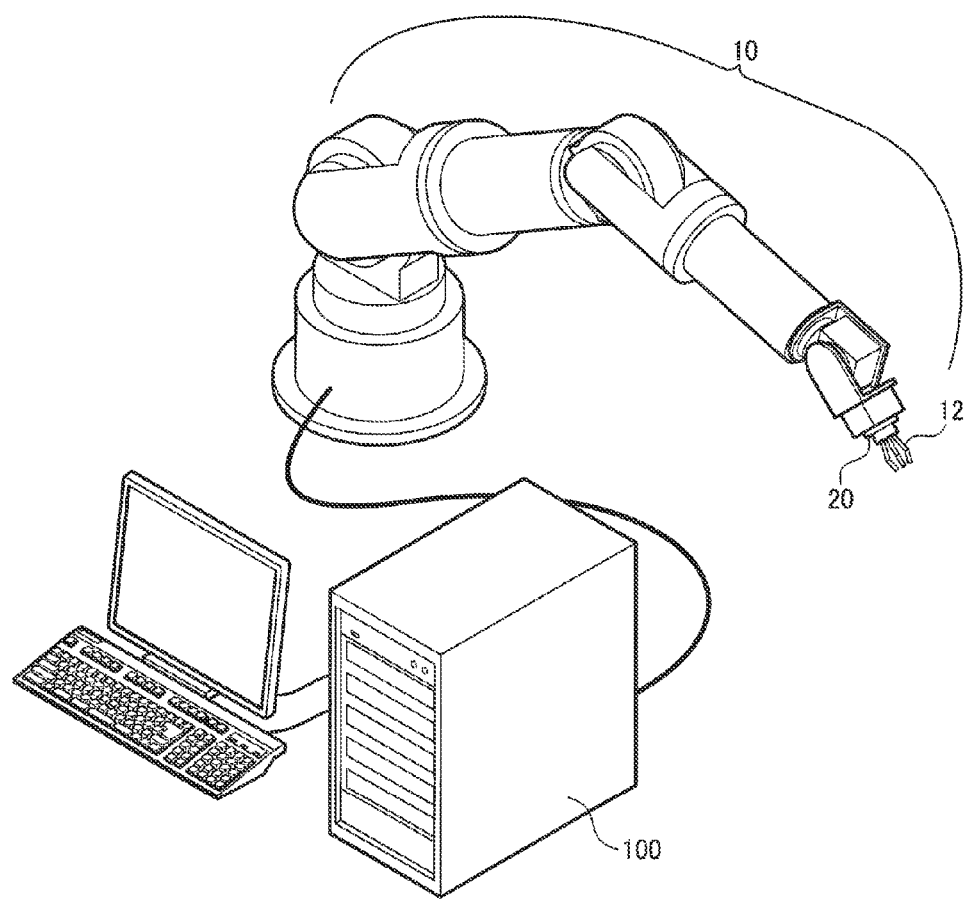
FIG. 1 shows a configuration example when a robot is used as mechanical equipment.
Figure 2:
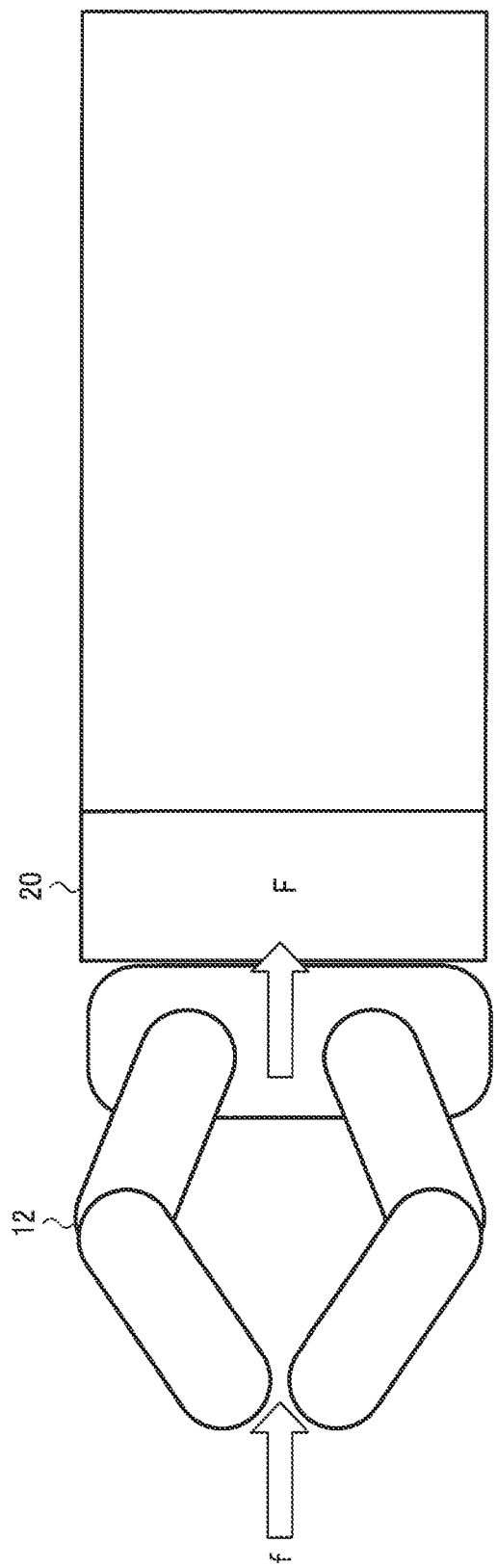
FIG. 2 is a diagram for explanation of a locational relationship between a mechanical mechanism and a force sensor.

However, it is highly likely that the force sensor is not provided in a location in contact with the work object, but provided in a location corresponding to a wrist of a robot 10 as shown in FIGS. 1 and 2. In this case, a force sensor 20 may detect the force by an end effector 12 (the mechanical mechanism in a broader sense, and specifically, may be a hand or a tool grasped by the hand) provided on the end of the sensor. Specifically, the gravity acting on the end effector 12 or the like is transmitted to the force sensor 20 and the force sense values include the forces other than the above described external force, and thereby, appropriate control of the robot 10 is difficult.

Figure 3A:
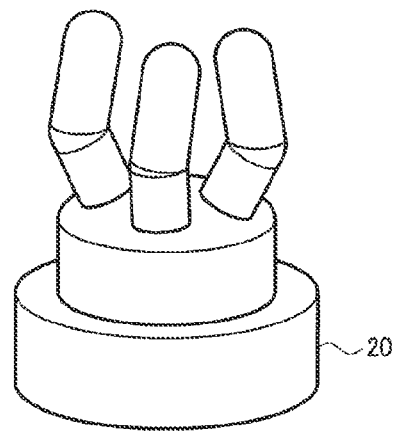
FIGS. 3A to 3C are diagrams for explanation of a reset movement.
Figure 3B:
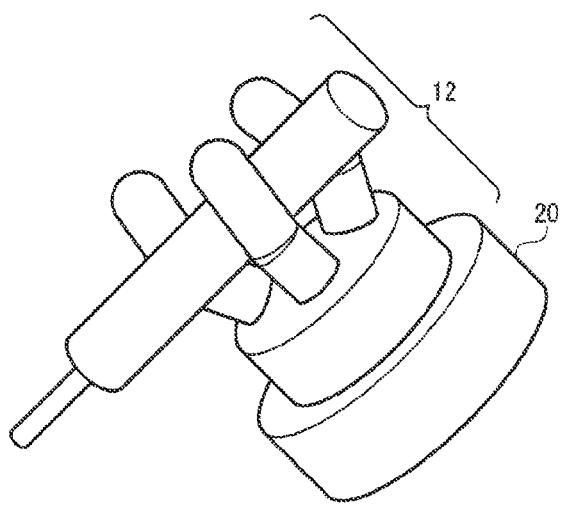
Figure 3C:
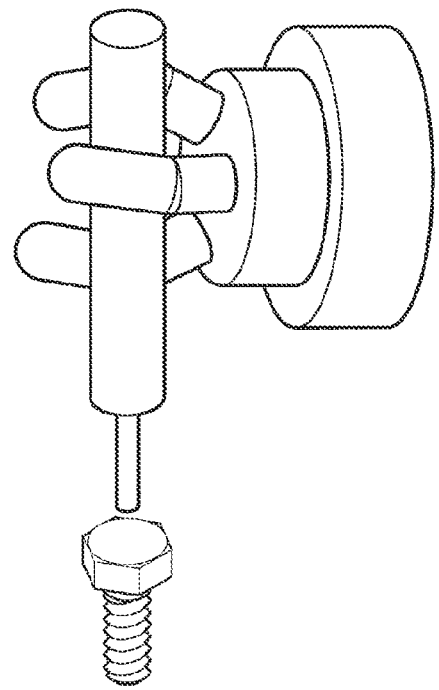

For the difficulty, correction has been performed by reset processing in the related art. As an example, as shown in FIG. 3A, an example in which a hand having finger structures has been attached to the end of the force sensor 20 is considered. Here, as shown in FIG. 3B, the hand grasps a tool (driver) and the end effector 12 corresponds to the hand and the tool. In the reset processing, as shown in FIG. 3C, the robot 10 is allowed to take the same position as that at work. Under the condition, if work is not actually performed and no external force acts, the force sense values from the force sensor 20 are values induced by the end effector 12. When the values are used as offset values, the force sense values induced by the end effector 12 coincide with the offset values unless the position of the robot 10 is changed. Therefore, processing of removing the offset values from the force sense values is performed after the storage of the offset values to the end of work, and thereby, the influence on the force sense values by the end effector 12 may be suppressed.

However, in the reset processing, the control has been greatly restricted because the position change of the robot 10 that may affect the offset values is impossible after the storage of the offset values to the end of work. Accordingly, in JP-A-6-339885, JP-A-2008-142810 and JP-A-2007-276112, a technique of correcting the influence on the force sensor 20 by the end effector 12 by physically modeling the end effector 12 provided on the end of the force sensor or the like is used. For example, the physical model may be a model representing a weight distribution or the like, and specifically, a model using a location of the center of mass (x,y,z) and a mass m as parameters. In the case where information on the physically modeled end effector 12 is stored in advance, the gravity and the centrifugal force acting on the end effector 12 may be obtained by a physical analysis, and further, how the forces are transmitted to the force sensor 20 may be analyzed. In this case, unlike the reset processing, even when the position changes, if the physical analysis according to the changed position is performed, the position change may be adapted and the restriction in control may be reduced. According to the technique, in JP-A-6-339885, JP-A-2008-142810 and JP-A-2007-276112, the force sense values from the force sensor 20 are corrected, and thereby, the desired control is realized.

However, in the technique of the related art, it has been assumed that the physical model of the end effector 12 is known. Accordingly, it is conceivable that some situations are difficult to be adapted by the technique of the related art. Three cases will be specifically explained below.

Note that, in the following explanation, the mechanical equipment is the robot 10 and the mechanical mechanism is the end effector 12 of the robot 10, however, the mechanical equipment and the mechanical mechanism are not limited to those as described above.

Figure 4A:
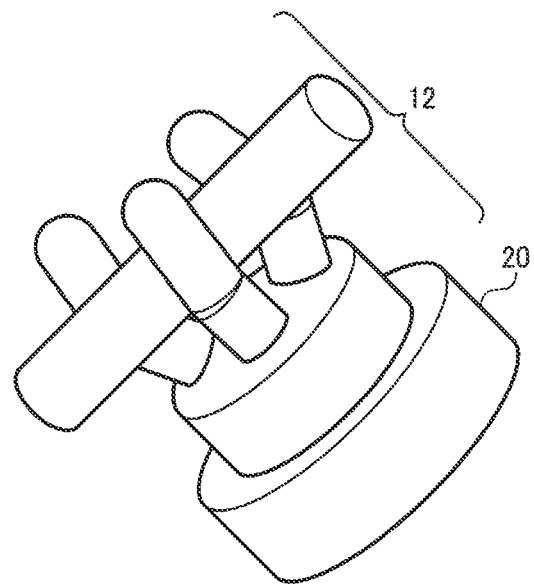
FIGS. 4A and 4B show examples when a physical model of the mechanical mechanism is unknown.
Figure 4B:
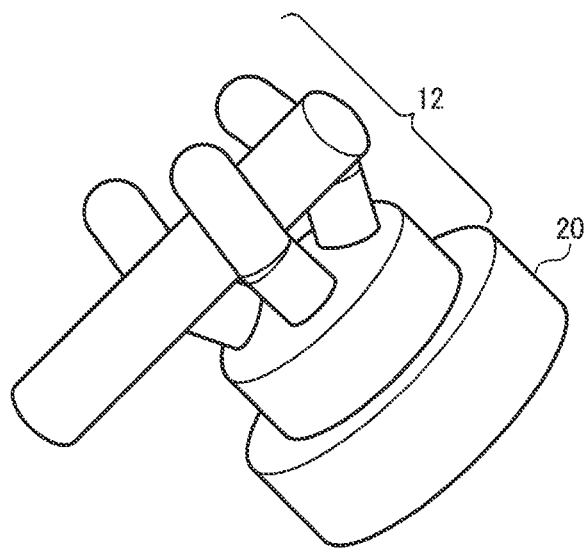

The first case is the case where the physical model of the end effector 12 is unknown. If the robot 10 for specialized application is used, the types of the end effector 12 provided on the end of the force sensor 20 are limited, and all of the physical models of the end effector 12 as candidates are held like the technique of the related art and an analysis may be made using the appropriate model. However, in the robot 10 having broad utility, the types of the attachable end effector 12 may be varied and it may be difficult to obtain the physical models in advance. Further, if it may be possible to store many physical models in advance, in the case where the end effector 12 includes the hand and the tool grasped by the hand as shown in FIGS. 4A and 4B, a problem remains. In the examples in FIGS. 4A and 4B, there is some degree of freedom in the location where the tool is grasped by the hand and, even when the physical model of the hand and the physical model of the tool are known, the physical model of the end effector 12 including both of them is unknown unless the location where the tool is grasped by the hand is determined. That is, in the examples in FIGS. 4A and 4B, it is impossible to determine the physical model of the end effector 12 until the tool is actually grasped, and application of the technique of the related art for analysis using a given known physical model is difficult.

Figure 5A:
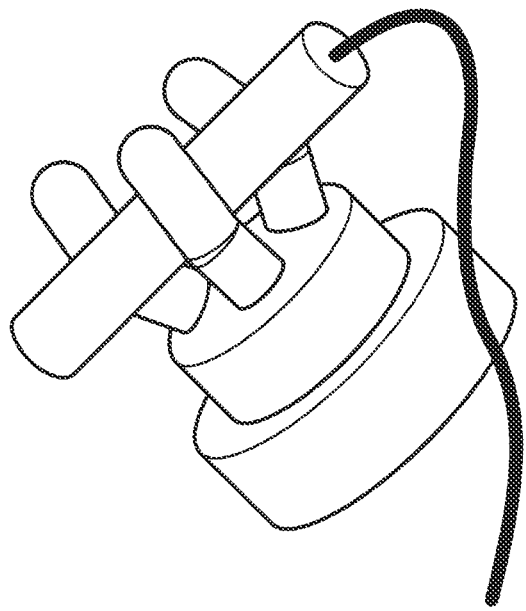
FIGS. 5A and 5B show examples when physical modeling of the mechanical mechanism is impossible.
Figure 5B:
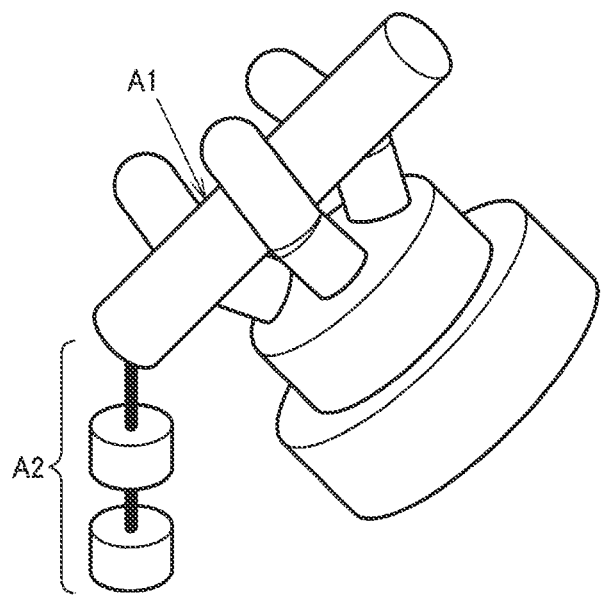

The second case is the case where the physical modeling of the end effector 12 is difficult in the first place. Specifically, as shown in FIG. 5A, the end effector 12 has a tool containing a power cable. In this case, the physical model changes depending on whether the cable is fully stretched or is slack. Alternatively, when the cable is in contact with a floor or the like, it is necessary to consider the friction between the cable and the floor or the like, or when the other end of the cable is connected to the power supply and the force required for movement of the tool is changed, the physical model may be changed. Further, the same applies to a cable with connector as shown in FIG. 5B or the like, and the relative locational relationship between the grasp part shown by A1 in FIG. 5B and the cable part shown by A2 may change, and it is difficult to represent the entire end effector 12 including A1 and A2 by a single physical model. In this case, the physical modeling is impossible in the first place, and the dynamical analysis is impossible, but the technique addressing the problem has not been shown in the related art.

Figure 6A:
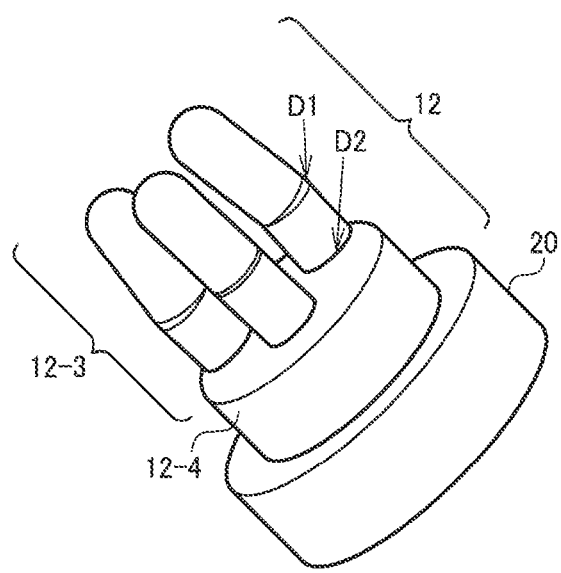
FIGS. 6A to 6C show examples when the mechanical mechanism has variable parts.
Figure 6B:
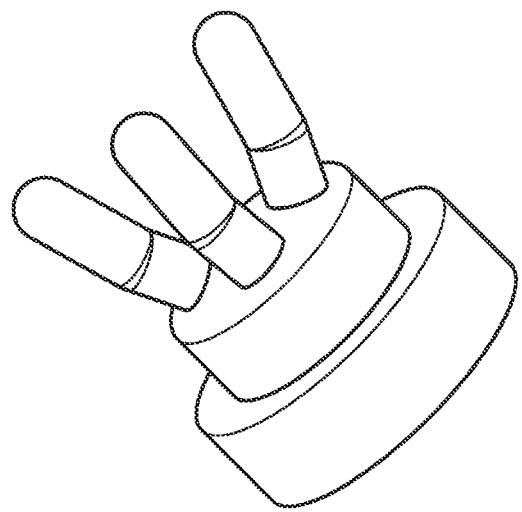
Figure 6C:
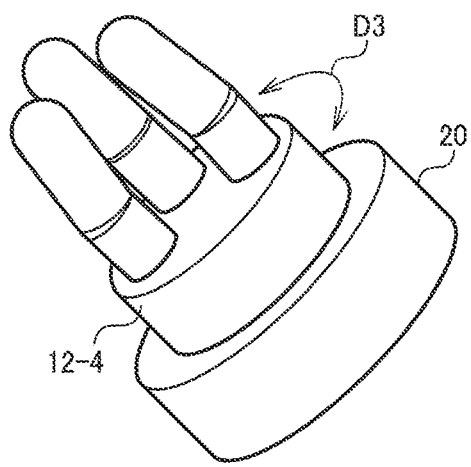

The third case is the case where the end effector 12 has a variable part. Specifically, in hands having finger structures as shown in FIGS. 6A to 6C, the physical model changes when the degree of opening of the fingers or the like changes. For example, in the case where the respective finger structures have joints in the parts shown by D1 and D2 as shown in FIG. 6A, the positions of the fingers may be changed by setting the respective joint angles. In this case, the physical model of the entire end effector 12 including the finger structures 12-3 and the wrist structure 12-4 differs between when the joint angles are set so that the tip ends of the respective finger structures are directed inward as shown in FIG. 6A and when the joint angles are set so that the tip ends of the respective finger structures are directed outward as shown in FIG. 6B. Further, when the wrist structure 12-4 is rotatable (here, relative rotation with respect to the force sensor 20) as shown by D3 in FIG. 6C, the physical model of the end effector 12 may change depending on the rotation angle of D3. However, in JP-A-6-339885, JP-A-2008-142810, or the like, processing in consideration of the change is not performed. Further, the drawing of the hand having finger structures is attached to JP-A-2007-276112, however, only simple processing according to the weight is performed, but the change in response to the state of the variable part or the like is not considered.

Accordingly, a technique is proposed of performing appropriate force sense value correction even when it is impossible to use the known physical model as it is. Specifically, in the case where the physical model is unknown, the physical model of the end effector 12 is estimated based on the force sense values acquired from the force sensor 20. Here, as the force sensor 20, a sensor having N (N is an integer equal to or more than two) triaxial force sensor units is used, and the details of the force sensor 20 will be described later. This processing will be described in detail in the first embodiment.

Further, in the case where the physical modeling of the end effector 12 is difficult, the processing itself includes reset processing. Note that, here, estimation processing to be explained in the first embodiment is tried and the possibility of the physical modeling of the end effector 12 is determined based on the trial effect. If the physical modeling is possible, the estimation result is used in the same manner as the first embodiment and, if impossible, the process moves to the reset processing. This processing will be described in detail in the second embodiment.

Furthermore, in the case where the physical model changes because the end effector includes a variable part, processing of obtaining the physical model representing the entire end effector 12 is performed by separating the end effector 12 into a fixed part and the variable part and performing processing according to position information on the respective parts. This processing will be described in detail in the third embodiment. Note that, in the third embodiment, as will be described later using FIGS. 27 to 29, for simplification of explanation, as the joint parts of the end effector 12, the parts shown by D2 in FIG. 6A are considered and the joints shown by D1, the rotation shown by D3 in FIG. 6C, or the like is not considered. However, the end effector 12 is not hindered from having structures such as joints in D1, D3 or other parts.

Note that the techniques to be explained in the first to third embodiments are not limited to those used independently, but some of them may be combined. For example, in the examples in FIGS. 4A, 4B, the tool is grasped by the hand including the variable part and the grasp location may be changed, and thus, the first and the third embodiments may be combined. Further, if the examples in which physical modeling is impossible as shown in FIGS. 5A and 5B are assumed as the tool of the object to be grasped, a combination with the second embodiment is possible. These combinations will be described in detail in the fourth embodiment.

The details of the force sensor 20 having N triaxial force sensor units used in the embodiments will be explained below. Subsequently, the first to fourth embodiments will be sequentially explained.

2. Force Sensor with Triaxial Force Sensor Units

2.1 Configuration Example of Force Sensor

First, the force sensor 20 having N triaxial force sensor units will be explained. The respective units of the N triaxial force sensor units acquire translational forces Fx, Fy, Fz of the respective axes of the X-axis, Y-axis, and Z-axis as unit output values. The respective units may be realized in various configurations, and, for example, as shown in FIG. 7, a configuration that enables force detection with high accuracy by uniform application of given pressure to sensor elements 46, 52, and 58 may be used. In a sensor unit 21 shown in FIG. 7, quartz plates 48A and 48B of the first sensor element 46, quartz plates 54A and 54B of the second sensor element 52, and quartz plates 60A and 60B of the third sensor element 58 are formed so that their respective crystal orientations may be different. As a result, the sensor unit 21 detects the translational force in the X-axis direction in the unit coordinate system by the first sensor element 46, detects the translational force in the Y-axis direction by the second sensor element 52, and detects the translational force in the Z-axis direction by the third sensor element 58.

Figure 8A:
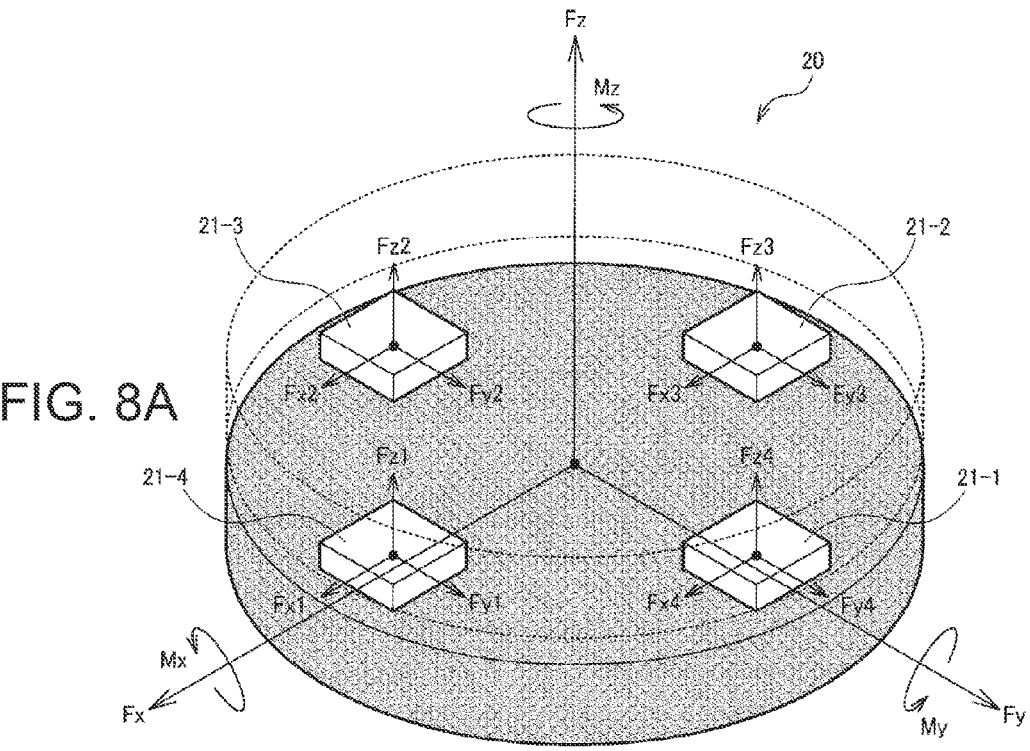
FIGS. 8A and 8B show an arrangement example of the triaxial force sensor units in the force sensor.
Figure 8B:
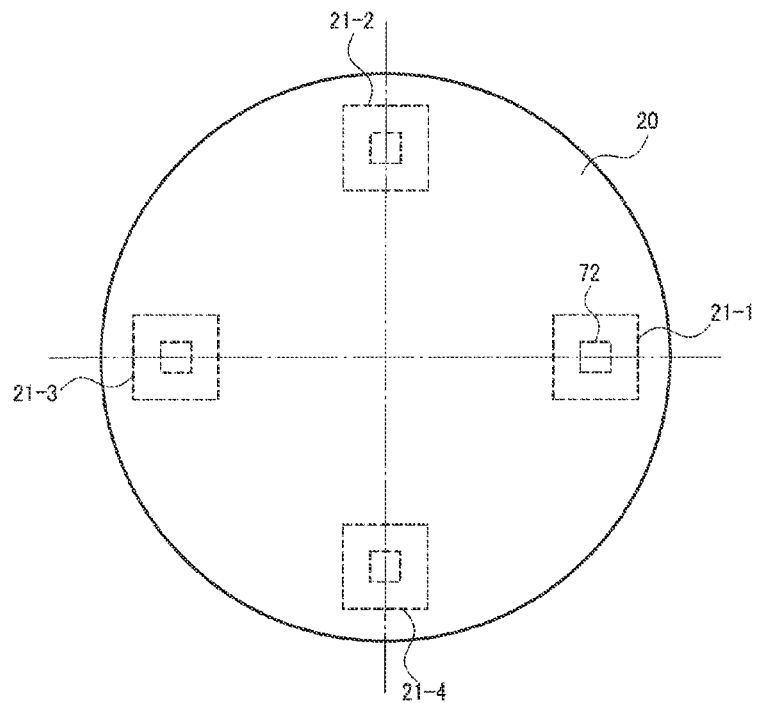

Further, in the force sensor 20, various techniques regarding the arrangement of the respective triaxial force sensor units are considered, and the arrangement as shown in FIG. 8A may be employed as an example. In the example of FIG. 8A, four triaxial force sensor units 21-1 to 21-4 are arranged on the XY-plane in the sensor coordinate system set for the force sensor 20. All of the directions of the X-axis, the Y-axis, and the Z-axis of the unit coordinate system set for the respective units coincide with the X-axis, the Y-axis, and the Z-axis of the sensor coordinate system. FIG. 8B shows the arrangement of FIG. 8A as seen from above (from the Z-axis positive direction of the sensor coordinate system). Note that the unit output values as the output of the respective units represent the translational forces in the X-axis, the Y-axis, and the Z-axis of the unit coordinate system set for the units.

Note that the arrangement of the units is not limited to that in FIG. 8A. For example, the number of triaxial force sensor units is not limited to four, but two, three, or five, or more. Further, not all of the force sensor units are necessarily arranged on the same plane, but may be staggered within the force sensor 20. Furthermore, it is not necessary that the coordinate axes of the sensor coordinate system coincide with the coordinate axes of the unit coordinate system, or the coordinate axes of a given unit coordinate system coincide with the coordinate axes of another unit coordinate system. In addition, modifications in various arrangements may be implemented. Note that, as will be described later in the first embodiment, it is desirable to avoid the arrangement in which all of the triaxial force sensor units are arranged in a line.

2.2.6 Use as Six-axial Force Sensor

Figure 9:
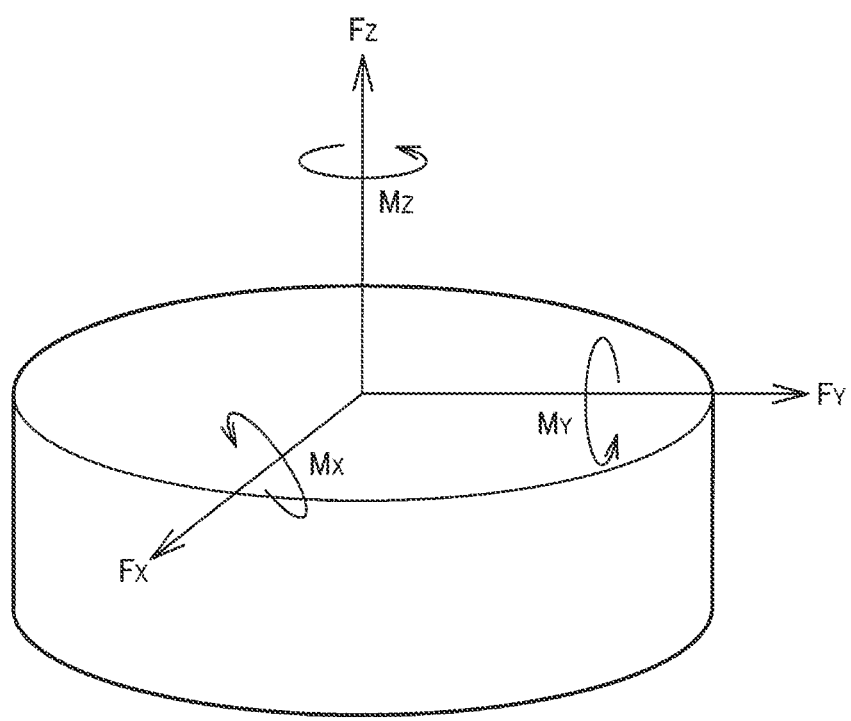
FIG. 9 is an explanatory diagram of a force sense values detected by a six-axial force sensor.

In the above described force sensor 20, three values of Fx, Fy, Fz are output as unit output values from the respective triaxial force sensor units, and 3×4 values may be acquired in the example of FIG. 8A. In the estimation processing to be described later in the first embodiment, it is assumed that the 3×4 force sense values are used as they are for the processing, however, the force sensor 20 may be used as a typical six-axial force sensor. Here, as shown in FIG. 9, the six-axial force sensor is a sensor that outputs six values of translational forces Fx, Fy, Fz with respect to the X-axis, the Y-axis, and the Z-axis in the sensor coordinate system and moment Mx, My, Mz around the respective axes as force sense values.

Figure 10:
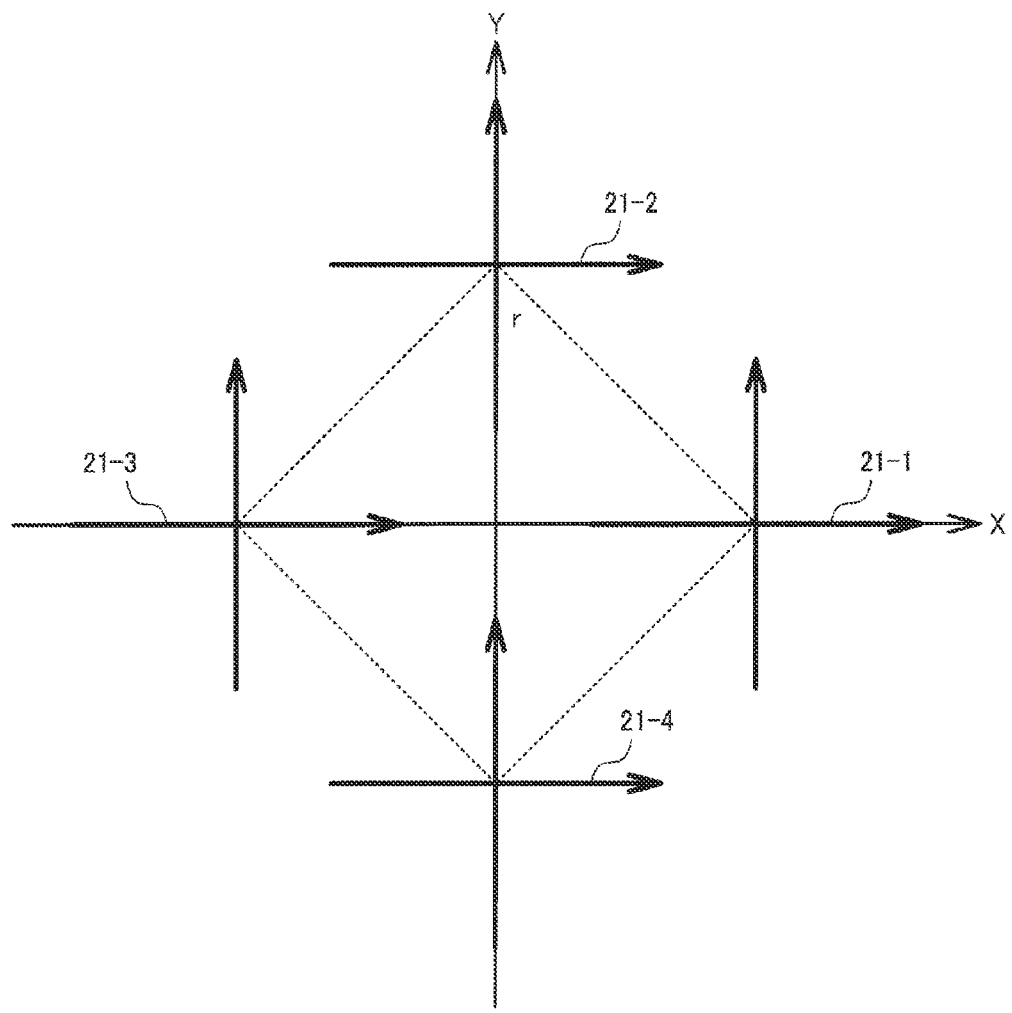
FIG. 10 shows a specific example representing a relationship between a sensor coordinate system and a unit coordinate system.

The example in which the four triaxial force sensor units are arranged on the XY-plane of the sensor coordinate system as shown in FIG. 8A and the coordinate axes of the sensor coordinate system coincide with the coordinate axes of the unit coordinate system, and, specifically, as shown in FIG. 10, the origins of the respective unit coordinate systems are located at (r, 0,0), (0,r, 0), (−r, 0,0), (0,−r, 0) in the sensor coordinate system is considered.

Suppose that the output of the unit 21-1 is $(F_{1x}, F_{1y}, F_{1z})$, the output of the unit 21-2 is $(F_{2x}, F_{2y}, F_{2z})$, the output of the unit 21-3 is $(F_{3x}, F_{3y}, F_{3z})$, and the output of the unit 21-4 is $(F_{4x}, F_{4y}, F_{4z})$. In this case, the translational forces Fx, Fy, Fz with respect to the X, Y, Z-axes in the sensor coordinate system and the moment Mx, My, Mz around the respective axes as force sense values of six axes detected as the entire force sensor 20 are given by the following equations.

$$Fx = F_{1x} + F_{2x} + F_{3x} + F_{4x}$$

$$Fy = F_{1y} + F_{2y} + F_{3y} + F_{4y}$$

$$Fz = F_{1z} + F_{2z} + F_{3z} + F_{4z}$$

$$Mx = r(F_{2z} - F_{4z})$$

$$My = r(F_{3z} - F_{1z})$$

$$Mz = r(F_{1y} - F_{3y} + F_{4x} - F_{2x}) \quad (1)$$

That is, calculation processing is performed based on the output values from the respective units, and thereby, the force sensor 20 shown in FIG. 8A may be used as the six-axial force sensor. Further, when the number, arrangement, or the like of the triaxial force sensor units in the force sensor 20 differs, calculation equations different from the equations (1) are used, but force sense values of six axes may be similarly calculated. In other words, even when N is an arbitrary integer equal to or more than two, the force sensor 20 of the embodiments may calculate force sense values of six axes based on 3×N values as a set of unit output values of the respective triaxial force sensor units.

Therefore, in the case where a robot is used as mechanical equipment and force control (impedance control or the like) of the robot is performed or the like, the result of the above described equations (1) or the like may be used as the typical six-axial force sensor. Under the condition that the large amount of information is desirable in the estimation processing to be described later or the like, processing may be performed using the 3×N values as the set of unit output values from the respective triaxial force sensor units. That is, the term "force sense value" refers to information output by the force sensor 20, and has a concept that may include both 3×N values as a set of unit output values and (Fx,Fy,Fz,Mx,My, Mz) obtained from the set.

In the first to fourth embodiments to be described later, the term "force sense value" is used for representation, however, typically, it is assumed that the physical model (the location of the center of mass or the like) is obtained based on the 3×N values as the set of unit output values of the force sense values, correction processing of the values of six axes (Fx, Fy, Fz, Mx, My, Mz) of the force sense values is performed based on the physical model, and the control of the mechanical equipment is performed based on the values of the six axes after the correction processing. Note that it is likely that the embodiments are on the assumption that the force sense values used for the estimation processing of the physical model are the 3×N values as the set of unit output values, however, using the 3×N values as the set of unit output values not the values of the six axes for the object of correction processing is not prevented.

3. First Embodiment

In the first embodiment, a technique of estimating the physical model of the end effector based on the force sense values acquired from the force sensor and performing correction processing using the estimated physical model will be explained. A system configuration example, the estimation processing of the physical model, and details of the processing will be explained below.

Figure 11A:
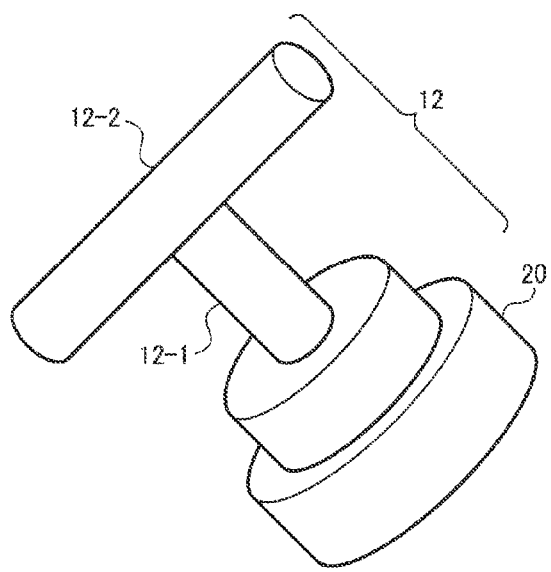
FIGS. 11A and 11B show examples when no variable part is provided and the physical model of the mechanical mechanism is unknown.
Figure 11B:
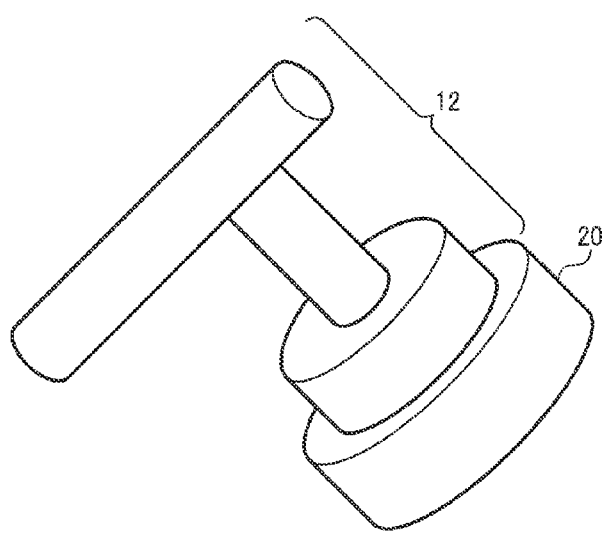

Note that, in the examples of FIGS. 4A and 4B, the end effector includes variable finger structures, and it becomes desired that the technique to be described later in the third embodiment is used together. Accordingly, here, an example in which the end effector 12 is formed without any variable part, but with a suction hand 12-1 shown in FIGS. 11A and 11B or the like is considered. Note that the suction hand 12-1 in FIGS. 11A and 11B fixes (grasps) a tool 12-2 in the tip end part. In this case, the physical model of the entire end effector 12 including the suction hand 12-1 and the tool 12-2 differs between the case where the part near the center of the tool 12-2 is suctioned as shown in FIG. 11A and the case where the part near the end of the tool 12-2 is suctioned as shown in FIG. 11B, and the physical model is unknown unless the suctioned location is previously known.

3.1 System Configuration Example

Figure 12:
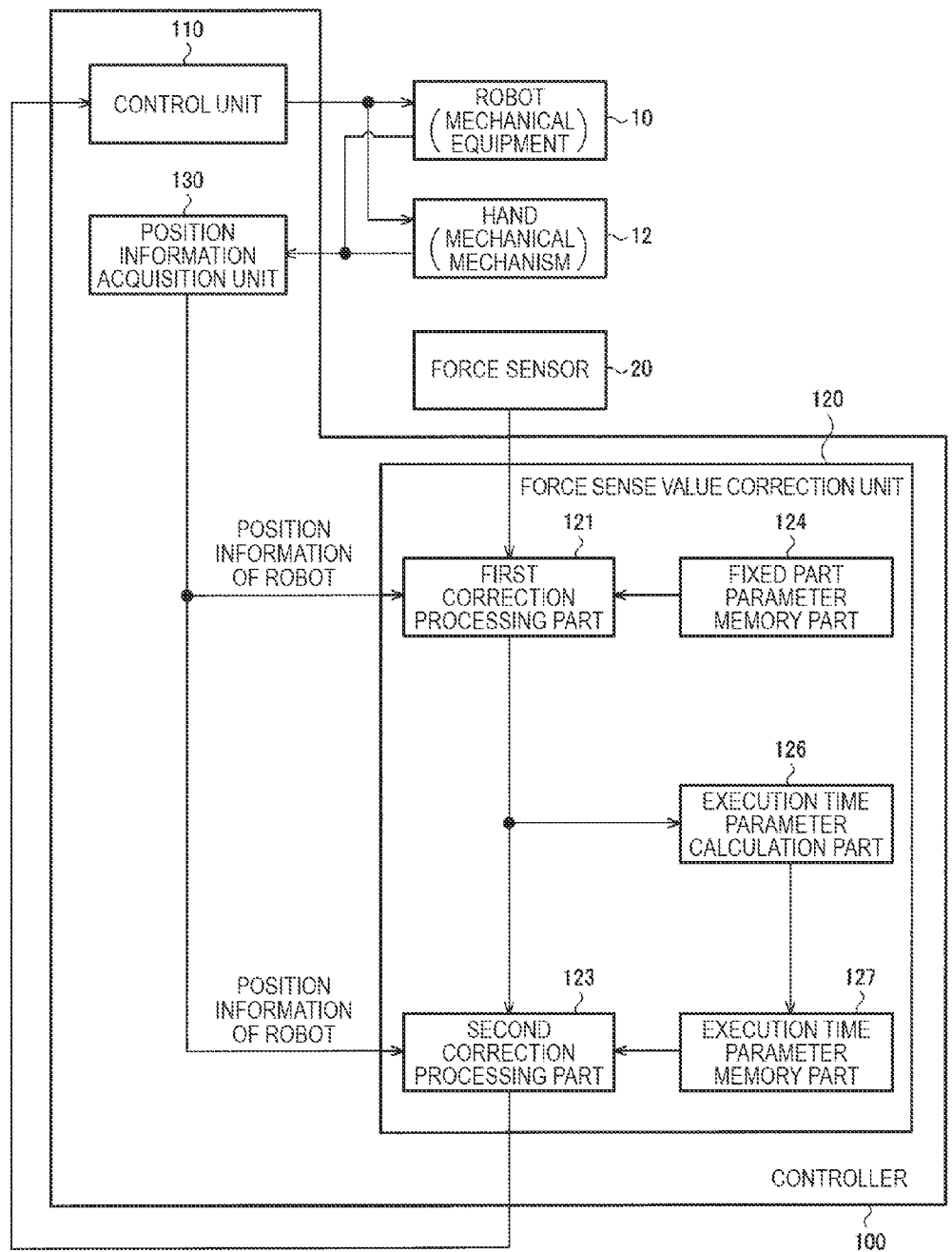
FIG. 12 shows a system configuration example of the first embodiment.

FIG. 12 shows a configuration example of a control system (here, a robot system) including the robot 10, the end effector (hand) 12, the force sensor 20, and a controller 100 of the robot of the embodiment.

The end effector 12 is a mechanism provided in the robot 10 and specifically refers to parts provided prior to the force sensor 20 in the robot 10. The end effector 12 includes a hand and a tool grasped by the hand (for example, a driver or the like).

The force sensor 20 is a sensor that detects forces acting on sensing parts, and the force sensor having a plurality of the triaxial force sensor units is used.

The controller 100 of the robot includes a controller 110, a force sense value corrector 120, and a position information acquirer 130. Note that the configuration of the controller 100 is not limited to the configuration in FIG. 12, but various modifications such that part of the component elements is omitted or another component element is added may be implemented.

The controller 110 performs control of the robot 10 and the end effector 12. In the embodiment, the control of the robot 10 and the end effector 12 is performed based on the force sense values after correction processing by the force sense value corrector 120. Here, the control of the robot 10 or the like may be control of amounts of angular changes, rates of changes, or the like of the joint parts, for example.

The force sense value corrector 120 acquires sensor information (force sense values) from the force sensor 20 and performs correction processing on the acquired force sense values. The force sense value corrector 120 includes a first correction processing part 121, a second correction processing part 123, a fixed part parameter memory part 124, an execution time parameter calculation part 126, and an execution time parameter memory part 127.

In the embodiment, as shown in FIG. 11A, the case where the physical model of the entire end effector 12 is unknown because an arbitrary location of a given member (the tool 12-2 in FIG. 11A) is grasped using the part having a known physical model (hereinafter, described as "fixed part", and specifically, the suction hand 12-1 in FIG. 11A) is assumed. The first correction processing part 121 performs correction processing of dynamically analyzing the fixed part and suppressing the influence on the force sense values by the fixed part. Specifically, the part reads out a fixed part parameter from the fixed part parameter memory part 124 in which the physical model of the fixed part is stored as the fixed part parameter, and performs correction processing based on the readout fixed part parameter and the position information of the robot 10 output from the position information acquirer 130. In the output from the first correction processing part 121, the force sense values resulting from the fixed part have been removed (reduced in the broader sense). The details of the correction processing for the fixed part will be described later.

The execution time parameter calculation part 126 estimates the physical model of the member attached to (grasped by) the fixed part based on the force sense values output from the first correction processing part 121. The details will be described later. The execution time parameter memory part 127 stores the physical model estimated in the execution time parameter calculation part 126 as an execution time parameter.

The second correction processing part 123 performs correction processing based on the execution time parameter stored in the execution time parameter memory part 127 and the position information of the robot 10 output from the position information acquirer 130. In the output from the second correction processing part 123, the force sense values resulting from the member having an unknown physical model have been removed (reduced in the broader sense). That is, in the force sense values output from the second correction processing part 123 to the controller 110, the values resulting from the end effector 12 have been removed.

The position information acquirer 130 acquires position information of the robot 10 and the end effector 12. Here, the position information refers to positions of the robot 10 and the end effector 12, and may be represented using joint angles as parameters, for example. When the values are determined with respect to all joint angles, the position of the robot 10 may be uniquely determined by forward kinematics. Specifically, the position information acquirer 130 may acquire values from encoders or the like corresponding to the respective joints of the robot 10 or the like.

3.2. Details of Correction Processing in First Correction Processing Part

Figure 13:
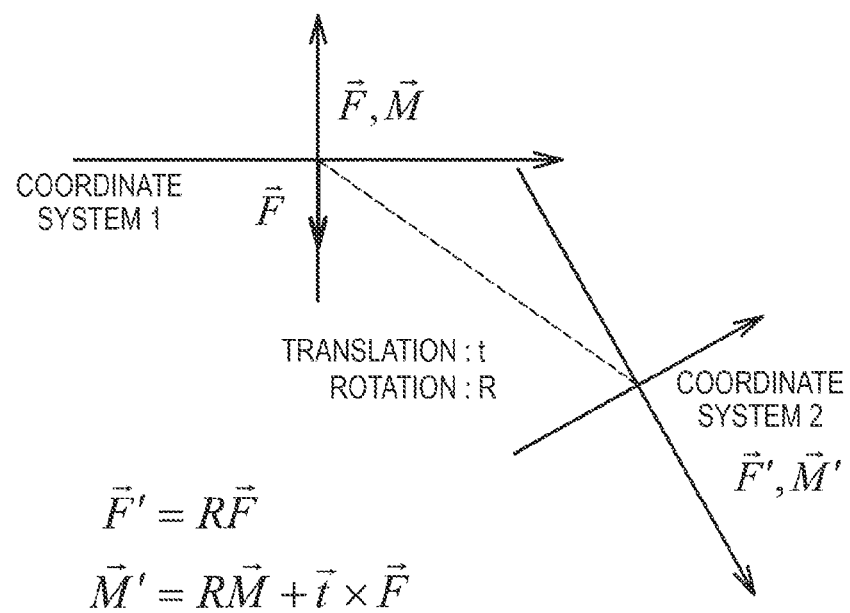
FIG. 13 is an explanatory diagram of coordinate conversion of translational force and moment.

The force sense value correction processing with respect to the fixed part performed in the first correction processing part will be explained. As shown in FIG. 13, the case where a translational force is given by F and moment is given by M in a certain coordinate system 1 is considered (F, M are three-dimensional vectors, for example). In this regard, if a coordinate system as a coordinate system 2 in which a translation vector of the origin from the coordinate system 2 to the coordinate system 1 is t and a rotation matrix from the coordinate system 2 to the coordinate system 1 is R is considered, when the force is observed in the coordinate system 2, a translational force F' and moment M' fulfill the following equations (2). Note that the second term on the right side of the second equation expresses cross product of the vectors.

$$F'=RF$$

$$M'=RM+t\times F \quad (2)$$

Figure 14:
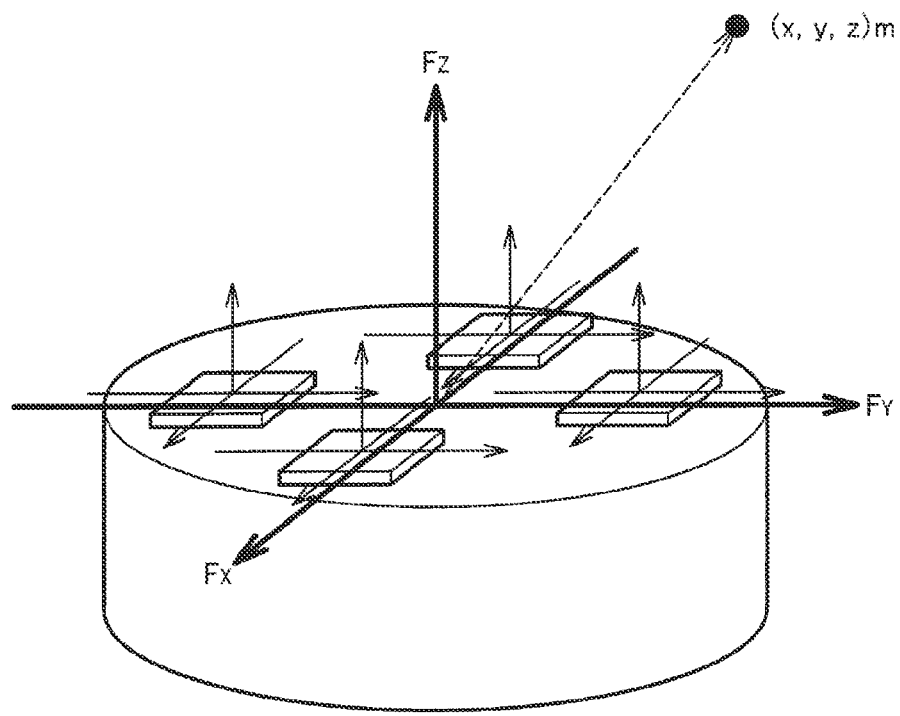
FIG. 14 is a diagram for explanation of correction processing according to the physical model.

Here, as shown in FIG. 14, with reference to the sensor coordinate system, using the end effector 12 that may be modeled as an object having mass m in a location (x,y,z), forces acting on the force sensor 20 are calculated. Here, as shown in FIG. 15, the sensor coordinate system is considered as the coordinate system 2 in FIG. 13, and a coordinate system with the origin at the location of the center of mass (x,y,z) and the Z-axis directed upward in the vertical direction is considered as the coordinate system 1 in FIG. 13.

In this case, regarding the F, M in the coordinate system 1, the gravity acting on the object having the mass m may be considered, and F=(0,0,−m), M=(0,0,0). Further, when there is no rotation between the coordinate systems 1, 2 as shown in FIG. 15, it is not necessary to consider R, and t=(x,y,z). Thereby, F'=(0,0,−m), M'=(−my,mx,0) according to the equations (2).

Figure 15:
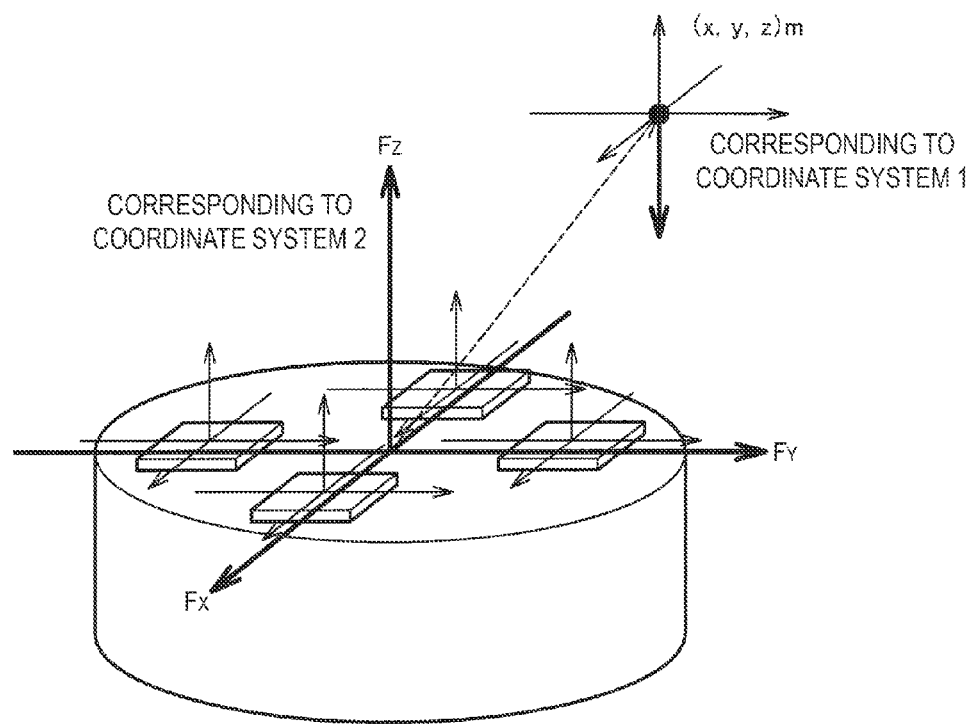
FIG. 15 is another diagram for explanation of the correction processing according to the physical model.

That is, in the example of FIG. 15, the force by the end effector 12 having the mass m in the location (x,y,z) in the sensor coordinate system is observed as F'=(0,0,−m), M'=(−my,mx,0). This is the situation that the translational force of F'=(0,0,−m) and the moment of M'=(−my,mx,0) act on the force sensor 20. Therefore, the obtained values of F' and M' are removed from the force sense values, and thereby, the influence on the force sense values by the end effector 12 may be suppressed.

Figure 16:
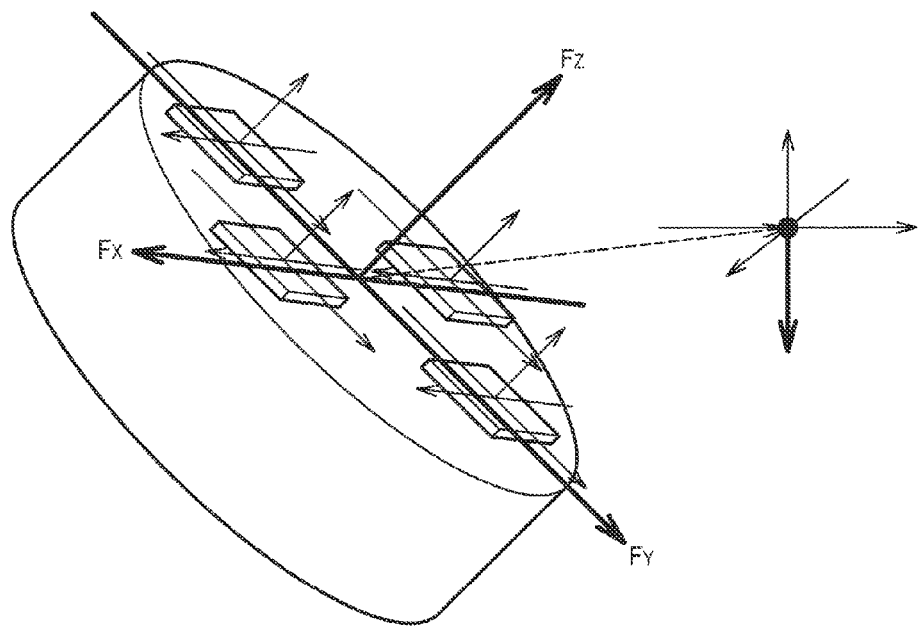
FIG. 16 is another diagram for explanation of the correction processing according to the physical model.

Further, when there is a rotation between the coordinate systems 1, 2, also R may be considered. In FIG. 16, the Z-axis of the coordinate system 1 is still upward in the vertical direction, and F=(0,0,−m), M=(0,0,0). Note that, in FIG. 16, the X-axis and the Y-axis are different from those of the coordinate system 1 in that the force sensor 20 is tilted with respect to the vertical direction or the like, and the elements of the rotation matrix R are determined based on values of a roll angle, a pitch angle, and a yaw angle of the sensor coordinate system with respect to the coordinate system 1. In this case, the correction processing may be performed based on the F' and M' obtained by the above equations (2).

3.3 Estimation Processing of Physical Model

Next, the estimation processing of the physical model in the embodiment will be explained. In the following explanation, the physical model is a model represented by (x,y,z) expressing the location of the center of mass (corresponding to the point of action of the force) and the mass m. As described above, the force sensor 20 having the N triaxial force sensor units may be used as the six-axial force sensor, and the estimation processing may be performed based on six force sense values as the six-axial force sensor. However, if N≥3, the force sensor 20 may output the larger pieces of information than the six force sense values of the six-axial force sensor, and an improvement in the estimation accuracy or the like may be expected. Therefore, in the embodiment, the estimation technique using 3×N output values as they are will be explained.

3.3.1 Basic Technique

When work in which an external force acts on the end effector 12 is not performed, errors or the like may be caused, however, basically, it is assumed that only the force by the end effector 12 acts on the force sensor 20. Further, the respective triaxial force sensor units detect projection components of the force by the end effector 12 corresponding to the respective units. In the embodiment, the physical model of the end effector 12 is estimated under the condition.

For simplification of explanation, first, the XY-plane is considered. When the force having the magnitude and the direction expressed by the vector F with given three-dimensional coordinates at the point of action of the force (x,y,z) acts on the force sensor 20 by the end effector 12, as shown in FIG. 17, a force expressed by a vector $F_{xy}$ as a projection of the vector F on the XY-plane with (x,y) at the point of action of the force acts on the XY-plane.

Figure 17:
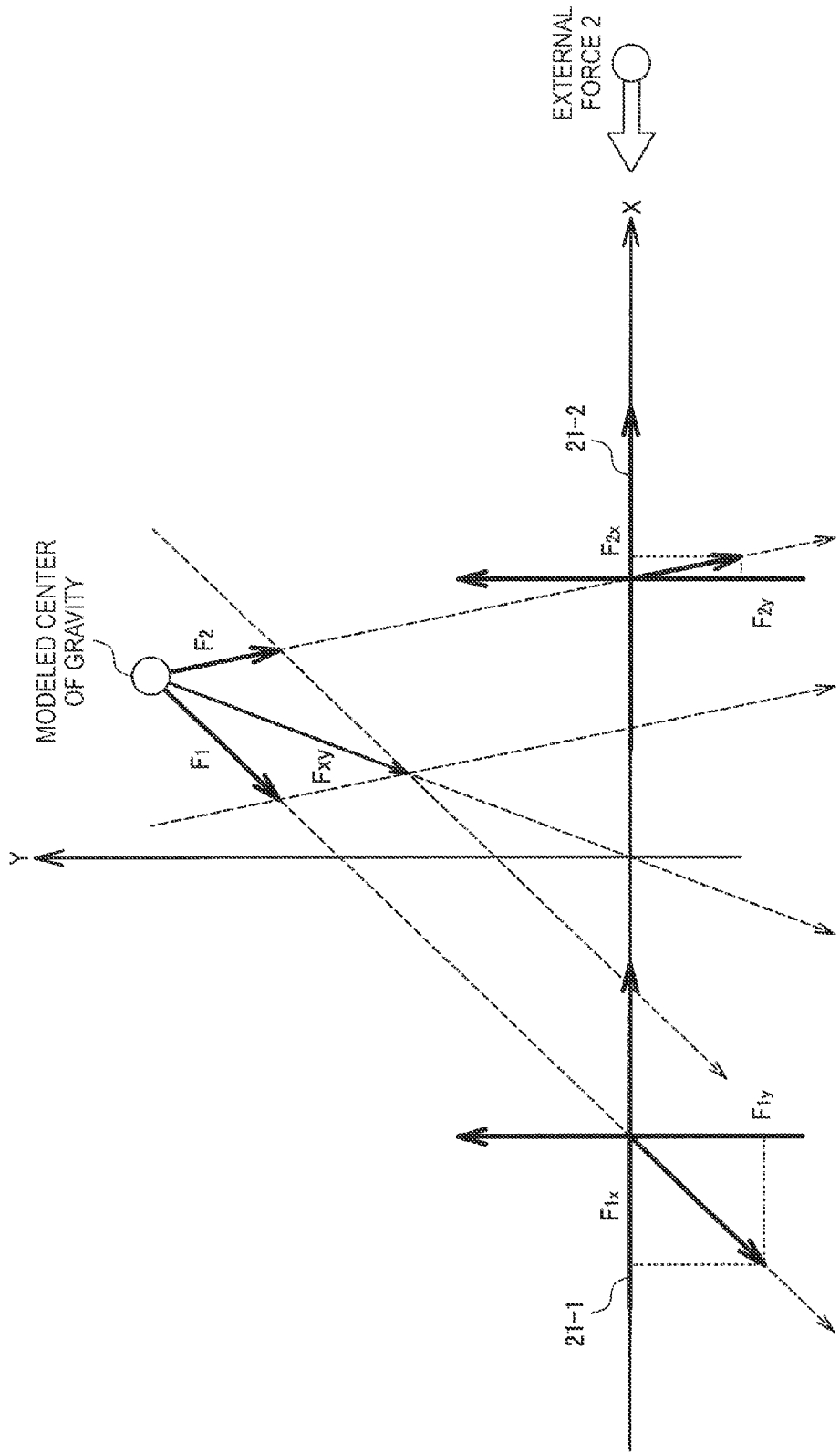
FIG. 17 is a diagram for explanation of estimation processing of a location of the center of mass in the XY-plane.

Here, as shown in FIG. 17, the number of sensor units is two. In this case, when the vector $F_{xy}$ is separated into a first direction as a direction from the point of action of the force to the origin of the coordinate system of the unit 21-1 and a second direction as a direction from the point of action of the force to the origin of the coordinate system of the unit 21-2, a first direction component F1 acts on the unit 21-1 and a second direction component F2 acts on the unit 21-2. That is, the unit 21-1 detects unit output values $F_{1x}$ and $F_{1y}$ corresponding to the vector F1 and the unit 21-2 detects unit output values $F_{2x}$ and $F_{2y}$ corresponding to the vector F2.

In the reversal of the flow, in the case where the unit 21-1 detects the unit output values $F_{1x}$ and $F_{1y}$ and the unit 21-2 detects the unit output values $F_{2x}$ and $F_{2y}$, when the vector F1 expressed by the $F_{1x}$ and $F_{1y}$ and the vector F2 expressed by the $F_{2x}$ and $F_{ey}$ are considered, the physical model of the end effector 12 that exerts the force on the force sensor 20 may be estimated.

Specifically, both a first line including the vector F1 and a second line including the vector F2 have properties of containing the point of action of the force, and thus, the intersection between the first line and the second line may be obtained as the point of action of the force (i.e., the location of the center of mass). Further, the magnitude and the direction of the force acting on the point of action may be obtained as the magnitude and the direction of a resultant vector of the vector F1 and the vector F2.

Figure 18:
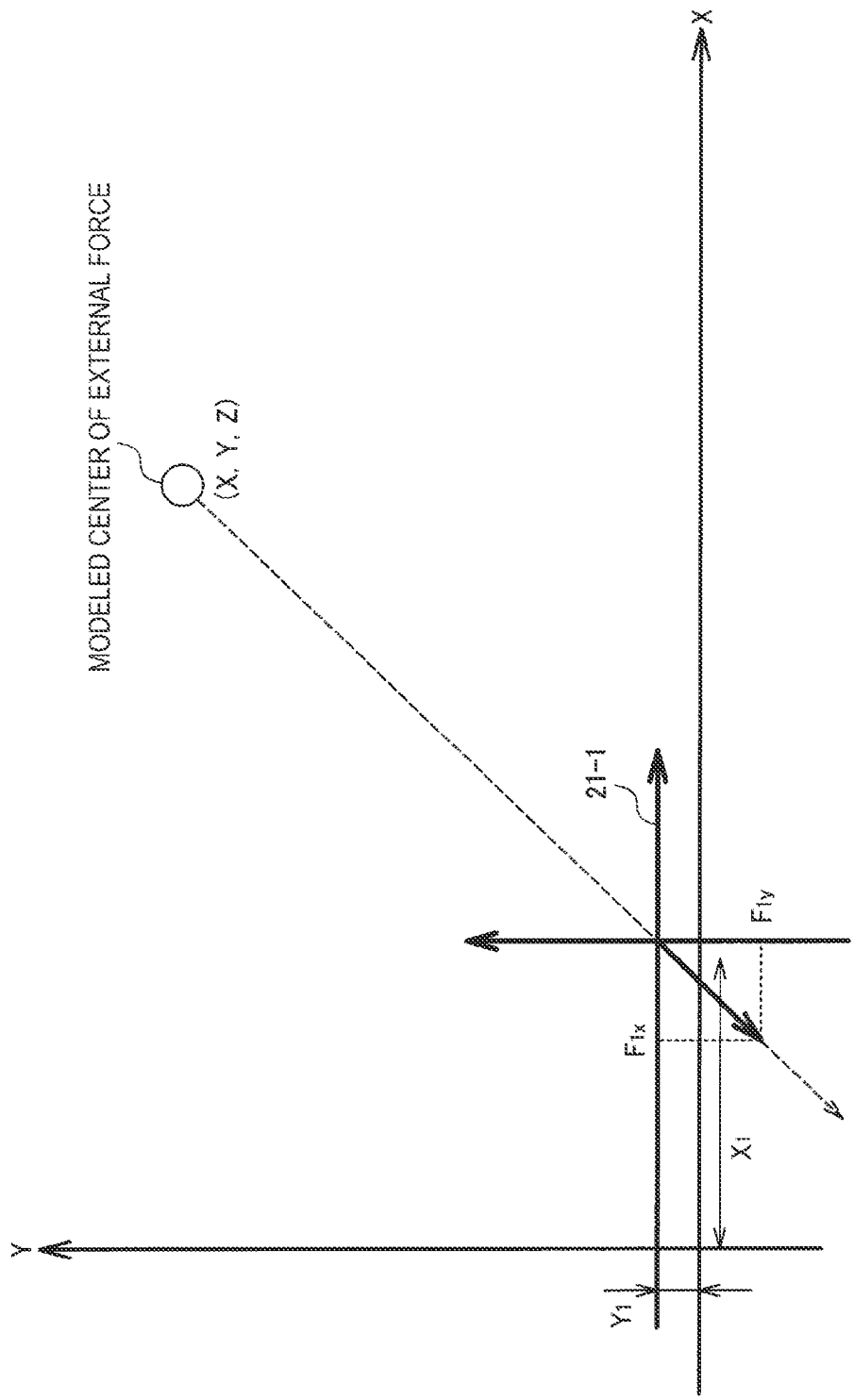
FIG. 18 is a diagram for explanation of estimation processing according to a unit placed in an arbitrary location on the XY-plane.

If the processing is extended to three dimensions, the estimation of the physical model of the end effector 12 may be performed. The condition is slightly generalized and supposes that the origin of the unit coordinate system of the unit 21-1 is set to (X1,Y1) in the sensor coordinate system as shown in FIG. 18. In this case, the line containing the point of action of the force (specifically, the point as the projection of the point of action on the XY-plane) is given by the following equation (3) and the equation (4) as a deformation thereof.

$$\frac{Y-Y_1}{X-X_1} = \frac{F_{1y}}{F_{1x}} \tag{3}$$

$$F_{1y}X_1 - F_{1x}Y_1 = F_{1y}X - F_{1x}Y \tag{4}$$

Note that, if the condition is further generalized, it is desirable to consider the rotation R between the unit coordinate system and the sensor coordinate system. In this case, it is only necessary to obtain the equal equation to the above equation (4) by correction using $R^{-1}$, and the detailed explanation is omitted here. The equation (4) may be expressed in a vector form by the following equation (5).

$$F_{1y}X_1 - F_{1x}Y_1 = (F_{1y} \quad -F_{1x} \quad 0)\begin{pmatrix} x \\ y \\ z \end{pmatrix} \tag{5}$$

This is considered with respect to the YZ-plane and the ZX-plane in the same manner, the following equation (6) holds.

$$\begin{pmatrix} F_{1y}X_1 - F_{1x}Y_1 \\ F_{1z}Y_1 - F_{1y}Z_1 \\ F_{1x}Z_1 - F_{1z}X_1 \end{pmatrix} = \begin{pmatrix} F_{1y} & -F_{1x} & 0 \\ 0 & F_{1z} & -F_{1y} \\ -F_{1z} & 0 & F_{1x} \end{pmatrix}\begin{pmatrix} x \\ y \\ z \end{pmatrix} \tag{6}$$

If it is possible to obtain an inverse matrix of the matrix on the right side of the equation (6), it is possible to calculate the location of the center of mass (x,y,z) by multiplication by the inverse matrix from the left. However, as known from its determinant taking a value of zero, it is impossible to obtain the inverse matrix because the matrix on the right side is not regular. This is also clear from that, as shown in FIGS. 17 and 18, only one line (a three-dimensional line if extended to three dimensions) containing the location of the center of mass is obtained from one triaxial force sensor unit and at least two lines are desired for identification of the location of the center of mass.

That is, the unit output value of the sensor unit 21-2 different from the sensor unit 21-1 may also be used for estimation of the location of the center of mass. Specifically, an equation corresponding to the equation (6) may be obtained with respect to the sensor unit 21-2 and a solution of simultaneous equations of the obtained equation and the equation (6) may be obtained. This corresponds to obtainment x, y, z in the following equation (7).

$$\begin{pmatrix} F_{1y}X_1 - F_{1x}Y_1 \\ F_{1z}Y_1 - F_{1y}Z_1 \\ F_{1x}Z_1 - F_{1z}X_1 \\ F_{2y}X_2 - F_{2x}Y_2 \\ F_{2z}Y_2 - F_{2y}Z_2 \\ F_{2x}Z_2 - F_{2z}X_2 \end{pmatrix} = \begin{pmatrix} F_{1y} & -F_{1x} & 0 \\ 0 & F_{1z} & -F_{1y} \\ -F_{1z} & 0 & F_{1x} \\ F_{2y} & -F_{2x} & 0 \\ 0 & F_{2z} & -F_{2y} \\ -F_{2z} & 0 & F_{2x} \end{pmatrix}\begin{pmatrix} x \\ y \\ z \end{pmatrix} \tag{7}$$

when $$q = \begin{pmatrix} F_{1y}X_1 - F_{1x}Y_1 \\ F_{1z}Y_1 - F_{1y}Z_1 \\ F_{1x}Z_1 - F_{1z}X_1 \\ F_{2y}X_2 - F_{2x}Y_2 \\ F_{2z}Y_2 - F_{2y}Z_2 \\ F_{2x}Z_2 - F_{2z}X_2 \end{pmatrix}, \quad M = \begin{pmatrix} F_{1y} & -F_{1x} & 0 \\ 0 & F_{1z} & -F_{1y} \\ -F_{1z} & 0 & F_{1x} \\ F_{2y} & -F_{2x} & 0 \\ 0 & F_{2z} & -F_{2y} \\ -F_{2z} & 0 & F_{2x} \end{pmatrix},$$

$$p = \begin{pmatrix} x \\ y \\ z \end{pmatrix}, \quad q = Mp$$

In the equation (7), the matrix M on the right side is regular with some exception, and the location of the center of mass may be estimated using the inverse matrix $M^{-1}$. Note that the case where the matrix M is not regular will be described later.

Under the ideal condition that there is no error in the unit output values detected by the triaxial force sensor units, the line obtained from the sensor unit 21-1 and the line obtained from the sensor unit 21-2 should have an intersection, and the solution may be determined from the equation (7). However, in practice, in consideration of the fact that an error is naturally caused and the two three-dimensional lines do not necessarily have an intersection in figural properties, the solution is not simply determined from the equation (7).

Accordingly, in the embodiment, the location of the center of mass p=(x,y,z) is obtained so that the error may be minimum. Specifically, a square error e of the equation (7) is defined as the following equation (8).

$$\|e\|^2 = \|q-Mp\|^2 = (q-Mp)^T(q-Mp) \tag{8}$$

Here, it is known that the solution that minimizes the square error e is obtained as a solution of the following normalization equation (9), and it is also known that the least squares solution as the solution of the following normalization equation (9) is formally given by the following equation (10).

$$M^T q = M^T M p \tag{9}$$

$$p = (M^T M)^{-1} M^T q \tag{10}$$

Note that $(M^T M)^{-1} M^T$ of the above equation (10) is called a generalized inverse matrix (or pseudo inverse matrix) and, if singular value decomposition may be performed on M as expressed in the following equation (11), the generalized inverse matrix is also given by the following equation (12).

$$M = U\Sigma V^T \tag{11}$$

$$(M^T M)^{-1} M^T = V\Sigma^{-1} U^T \tag{12}$$

Given that $n \geq m$ and $M \in R^{n \times m}$, $U \in R^{n \times n}$, $V \in R^{m \times m}$, $\Sigma \in R^{n \times m}$, and U, V are n-dimensional and m-dimensional orthonormal bases appropriately determined, the matrix M is decomposed as the following equation (13).

$$M = U\Sigma V^T = (U_0 \quad U_1 \quad \ldots \quad U_{n-1})\begin{pmatrix} \sigma_0 & \ldots & 0 \\ \vdots & \ddots & \vdots \\ 0 & \ldots & \sigma_{m-1} \\ 0 & \ldots & 0 \\ \vdots & \ddots & \vdots \\ 0 & \ldots & 0 \end{pmatrix}\begin{pmatrix} V_0^T \\ V_1^T \\ \vdots \\ V_{m-1}^T \end{pmatrix} \tag{13}$$

Here, σ as a diagonal element of Σ is called a singular value and the number of nonzero σ is equal to the rank of the matrix M. That is, whether or not it is possible to appropriately obtain the location of the center of mass using the above described equations may be determined by the number of nonzero σ.

3.3.2 Modified Examples

Through the processing (e.g., the processing of solving the equation (10)), the location of the center of mass may be obtained. However, when the number of triaxial force sensor units is two and the origins of the unit coordinate systems respectively set for the two units and the point of action of the external force are on the same line, it is impossible to obtain the location of the center of mass.

Specifically, in FIG. 17, the case is under the condition that the location of the center of mass is in the location shown as external force 2 and, in this case, both the unit 21-1 and the unit 21-2 can only detect the same information with respect to the external force. Specifically, the line obtained from the unit 21-1 coincides with the line obtained from the unit 21-2. Accordingly, significant information for only a single unit is obtained and estimation of the location of the center of mass becomes impossible. This corresponds to the condition that, in the equation (7), it is impossible to obtain the inverse matrix $M^{-1}$ (M is not regular). Further, the condition may be detected from the smaller number of nonzero σ in the equation (13).

As a first technique to address the problem, three (three or more in the broader sense) triaxial force sensor units may be used and the units may be arranged in the force sensor 20 so that not all the origins of the unit coordinate systems respectively set for the respective units are in a line. For example, when three units are arranged as shown in FIG. 19, wherever the point of action of external force is, at least two units detect significant information and the estimation of the location of the center of mass becomes possible.

In this case, an equation corresponding to the equation (6) may be considered with respect to the third unit, and the equations corresponding to all of the sensors may be solved as simultaneous equations. Specifically, when the number of units for use is three, the vector q of the equation (7) is extended to a 3×3=9 dimensional vector and the matrix M is extended to a matrix with 9 rows and 3 columns. The processing after the equation corresponding to the equation (7) is obtained is the same as that in the case of the two units.

Figure 19:
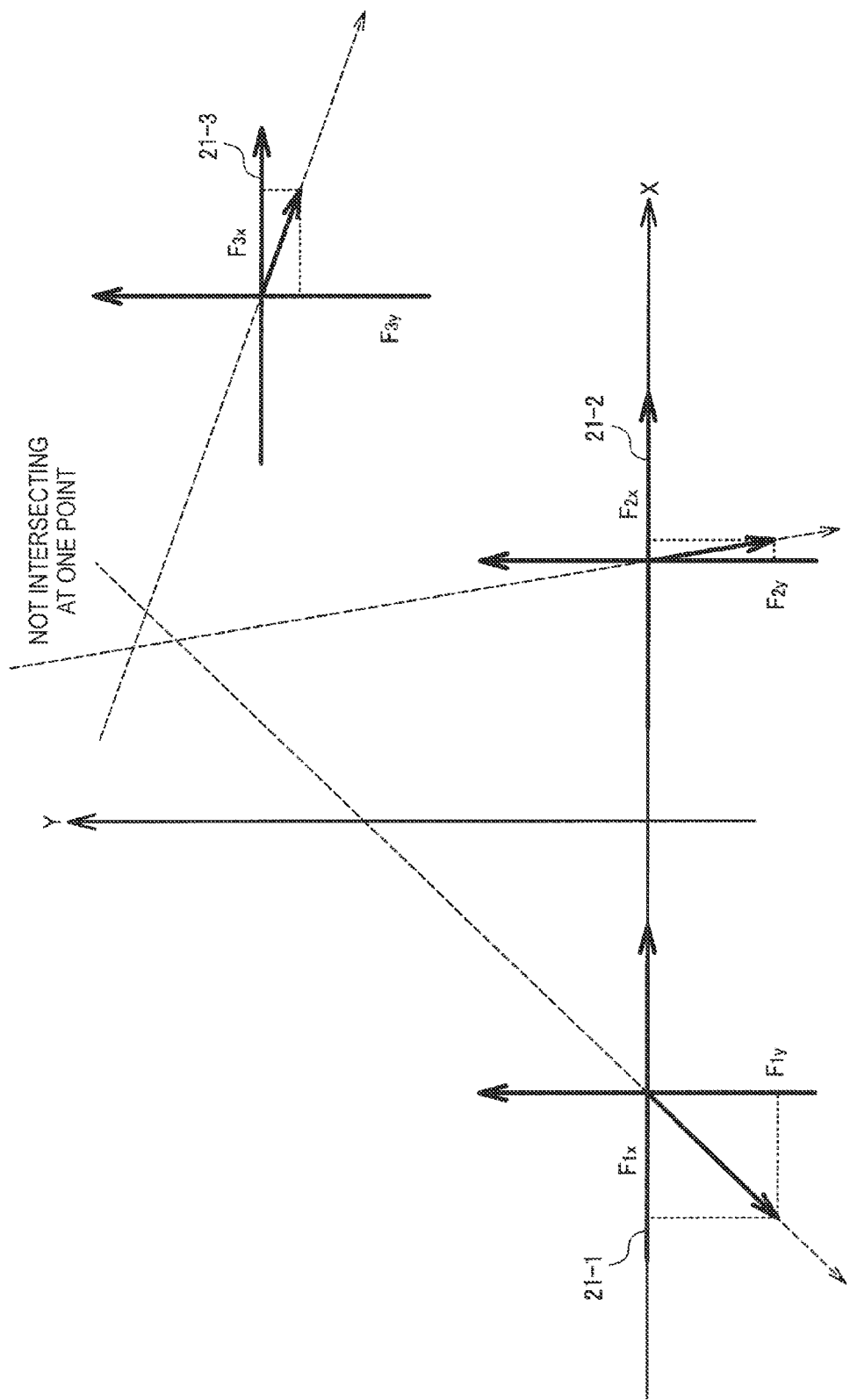
FIG. 19 is a diagram for explanation of estimation processing according to three triaxial force sensor units.

Note that, if an error is caused, as shown in FIG. 19, three or more lines do not intersect at one point on a plane. That is, in the three-dimensional space, it is unlikely to simply determine the solution from the equation (7) because there are some intersections, there is one intersection, but one of the lines does not pass through the intersection, and all lines have no intersection. Therefore, it is similarly desirable to obtain the least squares solution using the equation (8) and the subsequent equations, not to solve the equation (7) as it is in the case of using the three or more triaxial force sensor units.

Further, as a second technique to address the problem, with the number of triaxial force sensor units remaining at two, the location of the center of mass is not determined by single estimation processing, but the estimation processing more than once may be performed while the position of the robot 10 is changed (the position is changed so that the direction of the force acting by the end effector 12 in the sensor coordinate system may change). The position change is performed by changing from the state in FIG. 20A to the state in FIG. 20B, for example. It is assumed that, when the position of the robot 10 is changed, the location of the center of mass of the end effector 12 in the sensor coordinate system is changed, and the condition in which the origins of all unit coordinate systems and the location of the center of mass are on the same line may be escaped.

3.3.3 Improvement in Estimation Accuracy

The above described estimation processing has been explained assuming that the number of triaxial force sensor units of the force sensor 20 is two or three. However, the number of units is not limited to that, but four or more units may be used. When N units are used, estimation processing may be performed using 3×N values as a set of unit output values from the respective units, and thus, the improvement in the estimation accuracy may be further expected as N is larger.

Figure 21A:
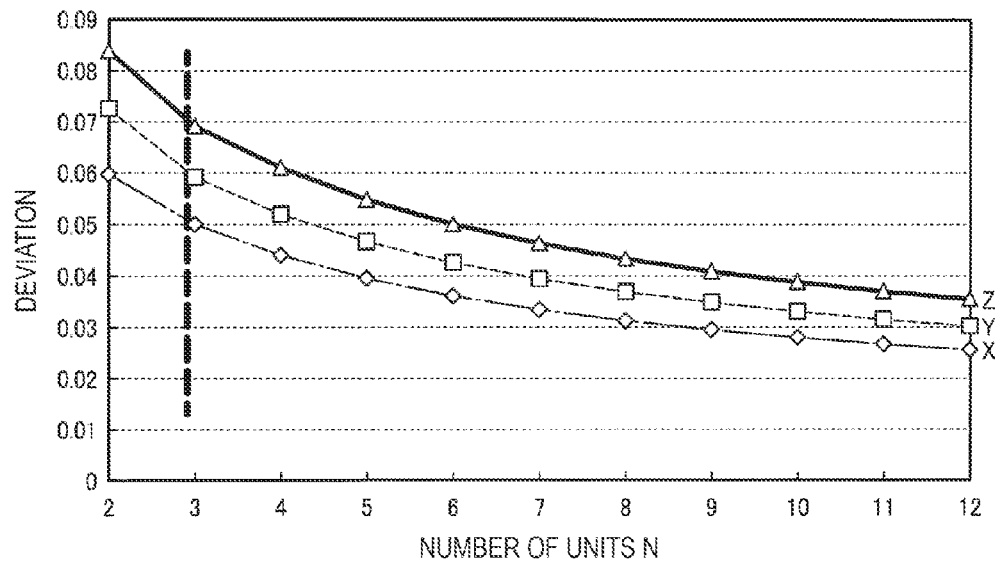
FIGS. 21A and 21B are diagrams for explanation of changes of estimation accuracy when the number of triaxial force sensor units is changed.
Figure 21B:
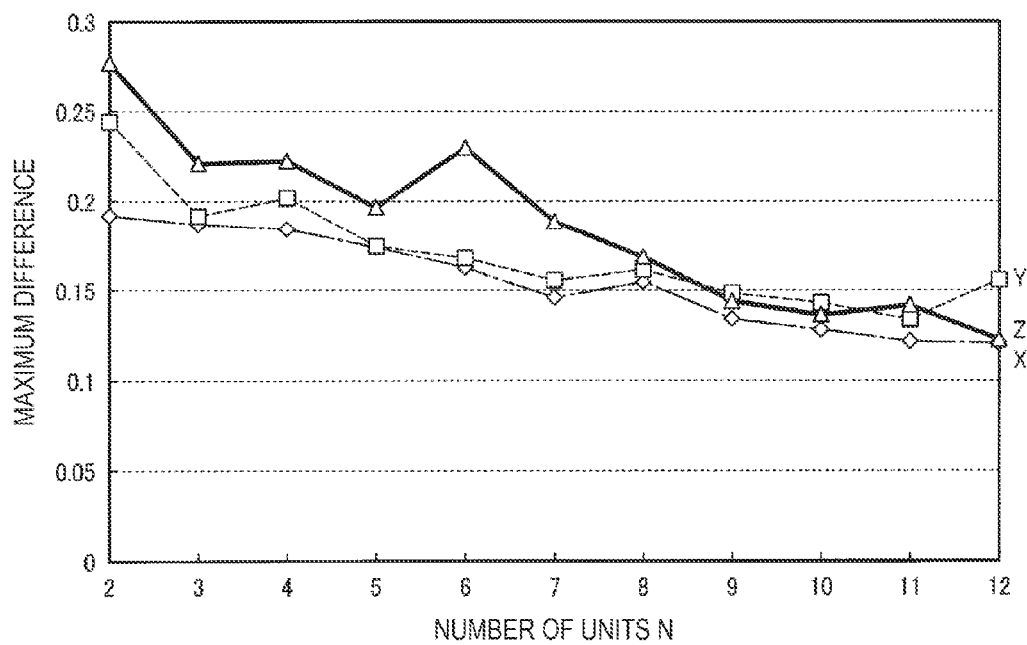

FIGS. 21A and 21B show results of simulations of estimation processing given that N is set to $2 \leq N \leq 12$ and more than 3% of random noise at the maximum is superimposed on the unit output values from the respective units. FIG. 21B is a graph showing the maximum values of errors relative to the solution data with respect to the respective axes of the X, Y, Z for each N, and FIG. 21A is a graph showing deviations of the estimation errors for each N.

As is clear from FIG. 21B, the maximum error tends to be smaller as N is larger though there are some variations. Further, as is clear from FIG. 21A, the deviation of the estimation error monotonically decreases as N is larger. That is, as the number of units contained in the force sensor 20 is increased, an improvement in the estimation accuracy may be further expected.

Note that, as the number of units is larger, increase in the cost, upsizing of the force sensor 20, or the like may be caused, and appropriate values may be set with respect to the number of units in a composite approach.

Further, as an approach for an improvement in the accuracy that is different from changing the number of sensor units, a technique of improving the accuracy by performing estimation processing using a plurality of positions is considered. For example, in the case where the noise in the sensor is very large or the like, the estimation accuracy becomes lower, however, the estimated values in the positions may be used in a composite approach.

Figure 20A:
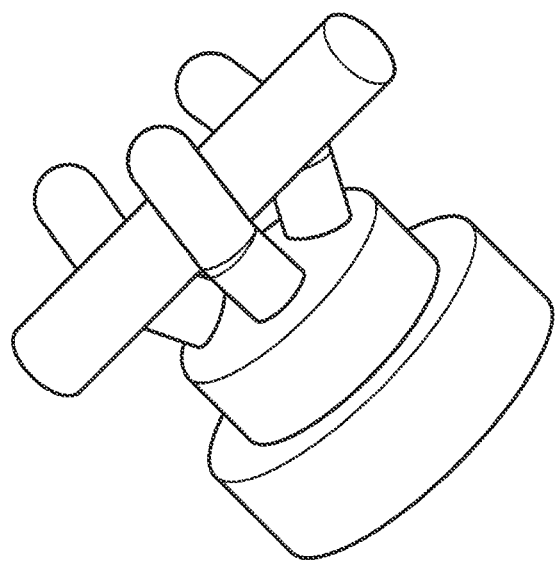
FIGS. 20A and 20B are diagrams for explanation of a position change.
Figure 20B:
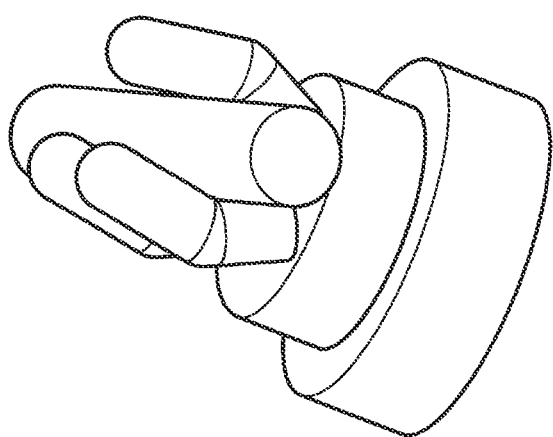

When a plurality of positions are used, as has been described using FIGS. 20A and 20B, the position may be changed and estimation processing may be performed both before and after the change. Accordingly, not only the processing is performed again with the different position if the estimated intersection (location of the center of mass) is determined to be inappropriate but also the position change and further estimation processing may be performed if the intersection may be appropriately estimated. For example, at least k (k is an integer equal to or more than two) appropriate estimated values may be acquired and an average of them or the like may be used as the final location of the center of mass. In this manner, the improvement in the estimation processing may be expected.

3.4 Details of Processing

A flow of the correction processing of the embodiment will be explained using a flowchart in FIG. 22. When the processing is started, first, output values (force sense values before correction processing) from the force sensor 20 are acquired (step S101). Then, correction processing corresponding to the fixed part is performed on the acquired force sense values (step S102).

Figure 23:
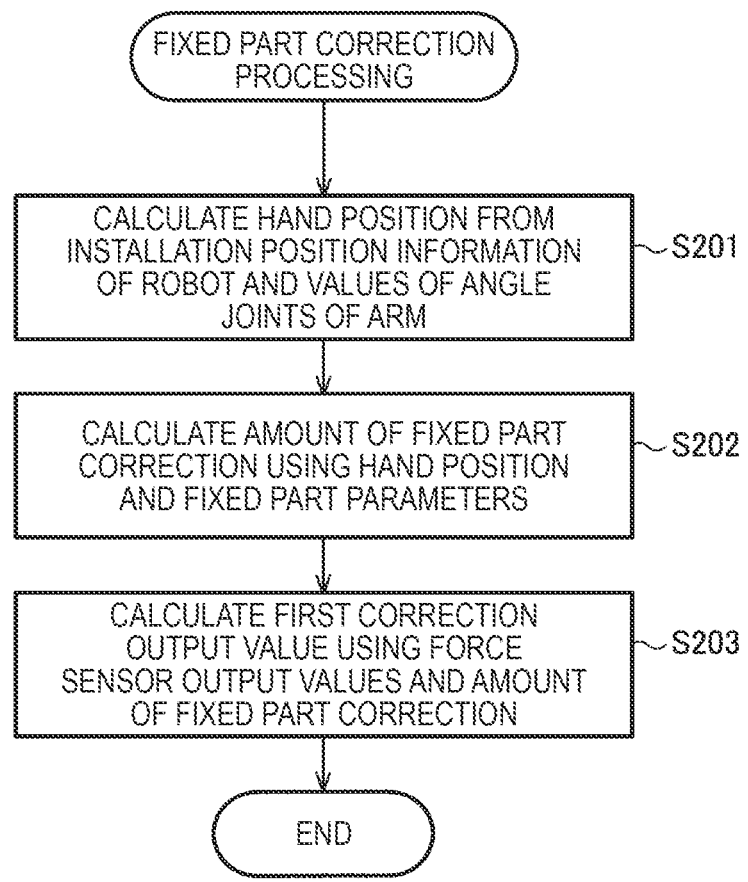
FIG. 23 is a flowchart for explanation of correction processing related to a fixed part.

FIG. 23 shows a flow of the correction processing of the fixed part at step S102 in a flowchart. In the correction processing of the fixed part, first, position information of the robot 10 is acquired (step S201). Here, the position information of the robot 10 is installation information representing an installation condition of the robot 10 (for example, information representing that the object on which it is installed is a floor, a wall, or a ceiling, and specifically, angle information with respect to the direction of gravity or the like) and values of joint angles of the joint parts of the robot 10 or the like. Then, amounts of fixed part correction as amounts of correction with respect to the force sense values are calculated based on the position information and fixed part parameters (as described above, corresponding to the physical models x, y, z, m of the fixed part) (step S202). The amounts of fixed part correction specifically correspond to the elements of F' and M' shown in the equations (1). Then, the force sense values after the fixed part correction processing are output based on the force sense values acquired at step S101 and the amounts of fixed part correction calculated at step S202 (step S203). The output at step S203 corresponds to the output of the first correction processing part 121 in FIG. 12.

After the force sense values after correction processing with respect to the fixed part (the output values of the processing at step S102) are obtained, lines shown in FIG. 17 or the like are obtained based on the values with respect to each triaxial force sensor unit and the location of the center of mass is estimated as the intersection of the lines (specifically, in the number of sensor units) (step S103). Specifically, it is only necessary to solve the equation (7) (or the equations obtained by extending the equation (7) for the three or more units), however, in consideration of errors, the least squares solution of the normalization equations is obtained from the equation (10) or the like.

It is possible to acquire the estimated value through the processing at step S103, however, the value is not necessarily appropriate. Specifically, as shown by the external force 2 in FIG. 17, when the origins of the coordinate systems of all of the triaxial force sensor units and the location of the center of mass are on the same line, the estimated value may be largely different from the actual value, and is not appropriate for the use in the correction processing. Accordingly, whether or not the estimated intersection (location of the center of mass) is appropriate is determined (step S104). The specific determination may be performed by determination of the number of nonzero σ the equation (13). As described above, the number of nonzero σ is equal to the rank of the matrix M, and it is possible to determine whether or not the equation (7) is solved, i.e., whether or not the intersection estimated from the equation (10) or the like is appropriate from the number of nonzero σ.

If the obtained intersection is not appropriate (No at step S104), the position change is commanded to the controller 110 (step S105), and the process returns to step S101. That is, the estimated intersection is not employed as the location of the center of mass, but the position is changed and the process is performed again from the acquisition of the force sense values.

On the other hand, if the estimated intersection is appropriate (Yes at step S104), the estimated intersection is employed as the location of the center of mass, the mass m is obtained as the magnitude of the resultant vector of the force vectors (F1, F2, etc.) obtained in the respective units as shown in FIG. 17, and (x, y, z, m) are used as execution time parameters (step S106).

Then, a determination as to whether or not the processing is performed again is made (step S107). This is the determination related to the above described an improvement in the accuracy. For example, when a technique of obtaining at least k (k is an integer equal to or more than two) execution time parameters and determining the final execution time parameters based thereon is used, the determination at step S107 is No if the number of execution time parameters acquired at the time is equal or more than k and Yes if the number is less than k. If Yes at step S107, the process moves to step S105 like that if No at step S104, the position is changed and the process returns to step S101, the force sense values are acquired, and the above described processing is performed.

If No at step S107, a determination as to whether or not the processing has been performed at a plurality of times is made (step S108). At step S108, in practice, the determination as to whether or not a plurality of execution time parameters have been obtained is made and, even in the case where the determination of No has been made at step S104 and the position change has been performed, if there has been only one acquired execution time parameter, the determination of No is made. If No at step S108, the single execution time parameter that has been obtained is stored as the execution time parameter used for the subsequent correction processing as it is (step S109).

If Yes at step S108, a determination as to whether or not the obtained execution time parameters have predetermined errors or less is made (step S110). It is assumed that, of the execution time parameters used in the embodiment, (x,y,z) representing the location are values in the sensor coordinate system. The location of the center of mass (x,y,z) in the sensor coordinate system should be constant even when the position of the robot 10 is changed unless the configuration of the end effector 12 itself is changed. Even if the execution time parameter is represented using another coordinate system than the sensor coordinate system, if the value is converted into a value in the sensor coordinate system, the value remains to have characteristics independent of the position of the robot 10. Further, it is natural that the mass m takes a constant value unless the configuration of the end effector 12 itself is changed regardless of the position of the robot 10 and the coordinate system for use. That is, under the ideal condition with no error, all of the execution time parameters obtained at the plurality of times should take the same value. In practice, it is difficult to consider that all of the execution time parameters are the same because errors are caused in the force sense values, the position information, or the like, but it is expected that they still take values close to one another to some extent. Conversely, if the value varies with more than the predetermined error, the reliability of the estimated location of the center of mass or the like is low by some factors.

Thus, if the execution time parameter has the predetermined error or less (Yes at step S110), the obtained execution time parameter is considered to be reliable, the process moves to step S109, and the execution time parameter at this time is stored. The value stored at step S109 may be a representative value of the execution time parameters or a value obtained from an average value or the like.

On the other hand, if No at step S110, the obtained execution time parameter is considered to be not reliable, and the execution time parameter at this time is not stored, but an error is output (step S111) and the processing is ended.

In the above described embodiment, as shown in FIG. 12, the control system includes the force sensor 20 that has the end effector (mechanical mechanism) 12 and the N (N is an integer equal to or more than two) triaxial force sensor units, acquires the unit output values to which values resulting from the end effector 12 have been added from the respective triaxial force sensor units of the N triaxial force sensor units, and outputs the force sense values based on the unit output values, the force sense value corrector 120 that corrects the force sense values based on the force sense values output by the force sensor 20, and the controller 110 that performs control of the robot 10 (mechanical equipment) including the end effector 12 based on the force sense values corrected in the force sense value corrector 120.

Here, the force sense values are values based on the unit output values and values as output of the force sensor 20, and specifically, include a set of unit output values from the respective triaxial force sensor units. Further, the force sense values may be values obtained by given arithmetic operation from the unit output values (specifically, the translational forces Fx, Fy, Fz at the X, Y, Z-axes and the moment Mx, My, Mz around the X, Y, Z-axes obtained using the equations (1)).

Thereby, when the control using the force sensor 20 having the N triaxial force sensor units is performed, the correction processing may be performed based on the force sense values in response to the unit output values output from the N triaxial force sensor units. As described above, in the control of the robot 10, it is likely to need some correction processing, not using the force sense values as the output of the force sensor 20 as they are, and this applies to the case where equipment other than the robot 10 is used as the mechanical equipment. In this case, though the typical six-axial force sensor outputs six force sense values, if it is possible to use the unit output values of the N triaxial force sensor units as they are, 3×N values may be acquired from the force sensor 20 of the embodiment. That is, if N=2, the correction processing with accuracy equal to that of the typical six-axial force sensor may be expected and, if N is three or larger, the amount of information is larger than that of the six-axial force sensor, and thus, the correction processing with higher accuracy or the like may be performed.

Note that, in the embodiment, the correction processing of the force sense values is performed based on the force sense value from the force sensor 20, however, the force sense values used for the correction processing and the force sense values as objects of the correction processing are not limited to the same values. For example, parameters desired for the correction processing are obtained using given values contained in the force sense values, and the correction processing on the other values contained in the force sense values may be performed using the obtained parameters. Specifically, the physical model of the end effector 12 may be obtained from the set of the unit output values, and correction processing on the translational forces of three axes and the values of six axes as moment around the respective axes may be performed using the physical model.

Further, the force sensor 20 may output information containing the unit output values output from the respective triaxial force sensor units of the N triaxial force sensor units as the force sense values. Furthermore, the force sense value corrector 120 may estimate the location of the center of mass of the end effector 12 based on the unit output values contained in the force sense values, and perform correction processing based on the estimated location of the center of mass. In addition, the force sense value corrector 120 may obtain N force vectors corresponding to the forces respectively detected by the N triaxial force sensor units from the unit output values contained in the force sense values, estimate the mass of the end effector 12 based on the magnitude of the resultant vector of the obtained N force vectors, and perform the correction processing based on the estimated mass.

Thereby, as the parameters (physical model) representing the end effector 12, the location of the center of mass (x,y,z) and the mass m may be used. If the location of the center of mass and the mass are obtained, the correction processing of the force sense values may be performed from them and the rotation matrix R (calculated from the position information of the robot 10) as shown in FIGS. 13 to 16.

Further, the force sensor 20 may have three or more triaxial force sensor units. More desirably, the force sensor 20 may have four or more triaxial force sensor units.

Thereby, appropriate intersection (location of the center of mass) estimation, an improvement in the accuracy of estimation processing, or the like may be realized. As shown by the external force 2 in FIG. 17, when the origins of all unit coordinate systems and the point of action of the external force (the location of the center of mass to be estimated) are on the same line, information obtained from the respective units is the same and appropriate estimation is impossible. Specifically, a tentative solution may be obtained from the equations (1) or the like, however, the value is far from the correct solution. In this regard, three or more triaxial force sensor units are arranged so that the origins of their unit coordinate systems may not be on the same line, regardless of wherever the location of the center of mass is in the sensor coordinate system, the above described situation is not caused, but the location of the center of mass may be appropriately estimated. Further, as shown in FIGS. 21A and 21B, the estimation accuracy may be improved by increasing the number of triaxial force sensor units contained in the force sensor 20 and, if the cost, the sensor size, or the like is acceptable, it is desirable that the number of triaxial force sensor units is larger.

Further, the force sensor 20 may have two (at least two) triaxial force sensor units. In this case, the force sense value corrector 120 may perform processing of estimating the location of the center of mass of the end effector 12 according to the first force sense values output from the force sensor 20 based on the unit output values from the N triaxial force sensor units in the first position of the robot 10, and the controller 110 may perform control of changing the position of the robot 10 to the second position different from the first position if the determination that the estimation of the location of the center of mass is impossible has been made by the force sense value corrector 120. Further, after the controller 110 controls the robot 10 to be in the second position, the force sense value corrector 120 estimates the location of the center of mass of the end effector 12 according to the second force sense values output from the force sensor 20 based on the unit output values from the N triaxial force sensor units, and performs the correction processing based on the estimated location of the center of mass.

Thereby, the force sensor 20 having two triaxial force sensor units may be used. The number of force sensor units for use is smaller, and cost reduction, downsizing, or the like of the force sensor 20 may be realized. Note that, as shown in FIG. 17, when the two triaxial force sensor units are used, it is likely that the origins of all triaxial force sensor units in the coordinate systems and the location of the center of mass are on the same line, and thus, not only the simple estimation of the location of the center of mass (obtainment of the intersection between two lines) but also its validation is performed, and, if the estimation of the intersection is not appropriately performed, the position may be changed and the estimation may be performed again. The position change may be the change from FIG. 20A to FIG. 20B, for example, and the position change by which the location of the center of mass of the end effector 12 changes in the sensor coordinate system.

Further, the force sense value corrector 120 may estimate the location of the center of mass of the end effector 12 by obtaining the least squares solution of the location of the center of mass of the robot 10 using a normalization equation.

Here, the normalization equation is an equation having a solution that minimizes the square error e shown in the equation (8), and given by the equation (9) in this case. Further, the least squares solution is the solution of the normalization equation, and the least squares solution as the solution of the normalization equation of the equation (9) is given by the equation (10).

Thereby, the location of the center of mass may be estimated as the intersection of the lines using the equations (8) to (10). It is unlikely that the force sense values or the like output from the respective triaxial force sensor units contain no error, and the condition in which the lines determined with respect to each unit as described above have intersections or no intersection or the like may be considered and it is uncertain whether the intersection is appropriately determined from the equation (7). In this regard, the least squares solution is obtained from the normalization equation, and thereby, estimation with less errors may be performed under the condition.

Further, the force sense value corrector 120 may perform singular value decomposition on the normalization equation, and determine whether or not the estimation of the location of the center of mass is possible based on the number of singular values obtained by the singular value decomposition.

Here, the singular value decomposition is decomposition as shown in the equation (13), and the number of singular values refers to the number of nonzero diagonal elements of those of the matrix $\Sigma$ in the equation (13).

Thereby, whether or not the estimation of the location of the center of mass (estimation of the intersection) has been appropriately performed may be easily determined. As described above, in the embodiment, the equation (7) is not solved as it is, but the least squares solution is obtained using the equation (8) and the subsequent equations. Accordingly, a tentative solution may be estimated under the condition that it is impossible to obtain the solution in the first place such that the matrix M of the equation (7) is not regular. Therefore, it is not desirable to employ the obtained solution as it is in consideration of the subsequent correction processing or the like. Accordingly, the validity of the intersection estimated according to some technique should be checked and, as an example, the determination by the number of singular values may be performed.

Further, the force sensor 20 may be a six-axial force sensor that acquires three values as unit output values from the respective triaxial force sensor units of the N triaxial force sensor units, and thereby, acquires 3×N values, calculates the translational forces Fx, Fy, Fz of the X-axis, the Y-axis, and the Z-axis and the moment Mx, My, Mz around the respective axes based on the acquired 3×N values, and outputs information containing the calculated Fx, Fy, Fz and Mx, My, Mz as the force sense values.

Thereby, the force sensor 20 of the embodiment may be used as a typical six-axial force sensor. In the force control of the robot 10 or the like, it is assumed that the processing is possible if six values of the six-axial force sensor are output as the force sense values. In this case, even if all of the 3×N values (the force sense values as a set of unit output values) output from the N units are used for the control, the processing may become complex and undesirable. Therefore, under the condition that it is only desired that the force sensor functions as a typical six-axial force sensor, the processing may be simplified to output Fx, Fy, Fz and Mx, My, Mz.

Further, the force sense value corrector 120 may perform correction processing based on a plurality of the force sense values obtained in a plurality of positions of the robot 10.

Thereby, the position of the robot 10 may be changed and the correction processing of the force sense values may be performed based on the force sense values obtained in the respective positions. It is assumed that the influence on the force sensor 20 by the end effector 12 varies depending on the position of the robot 10, and correction processing using different conditions in a composite approach may be performed by the correction processing using the plurality of positions. That is, as a larger number of positions are used, the correction processing with higher accuracy may be performed. This corresponds to the processing at step S107 and step S105 in the flowchart of FIG. 22.

Further, as has been described in the embodiment, the mechanical equipment may be the robot 10, and the mechanical mechanism may be the end effector 12 of the robot 10. In this case, the force sense value corrector 120 is provided in correspondence with the end effector 12 of the robot 10, acquires the force sense values from the force sensor 20 having the N triaxial force sensor units, and performs correction processing of the acquired force sense values, and the controller 110 performs control of the robot 10 and the end effector 12 based on the force sense values after the correction processing.

Here, the end effector 12 of the robot 10 is equipment attached to the end point of the robot 10 and has concepts including a hand, a tool, or the like. Note that, in consideration of the fact that the mechanical equipment may be equipment other than the robot 10 explained in the embodiment, the mechanical mechanism has a concept not limited to the end effector 12, but including other mechanisms.

Thereby, the robot 10 may be used as the mechanical equipment. In this case, the force on the force sensor 20 by the end effector 12 itself may be corrected and, for example, force control (for example, impedance control) using an external force acting on the end effector 12 of the robot 10 or the like may be performed.

Note that a part or the major part of the processing of the control system or the like of the embodiment may be realized by programs. In this case, a processor such as a CPU executes the programs, and thereby, the control system or the like of the embodiment may be realized. Specifically, the programs stored in an information storage medium are read out and the readout programs are executed by the processor such as a CPU. Here, the information storage medium (computer-readable medium) stores programs and data, and its function may be realized by an optical disk (a DVD, a CD, or the like), an HDD (hard disk drive) or a memory (a card-type memory, a ROM, or the like). The processor such as a CPU performs various processing of the embodiment based on the programs (data) stored in the information storage medium. That is, in the information storage medium, programs for causing a computer (equipment including an operation unit, a processing unit, a memory unit, and an output unit) to function as the respective units of the embodiment (programs for allowing the computer to execute processing of the respective units) are stored.

4. Second Embodiment

In the second embodiment, the case where the physical modeling of the end effector 12 is difficult as shown in FIGS. 5A and 5B will be explained. Note that the technique of the embodiment does not attempt physical modeling by complex analysis processing, but automatically detects whether or not physical modeling is possible by a system and switches to the reset processing in the related art if a determination as being impossible is made.

The system configuration example is shown in FIG. 12 like the first embodiment, and the detailed explanation will be omitted. The correction processing of the embodiment will be explained using a flowchart in FIG. 24.

Figure 22:
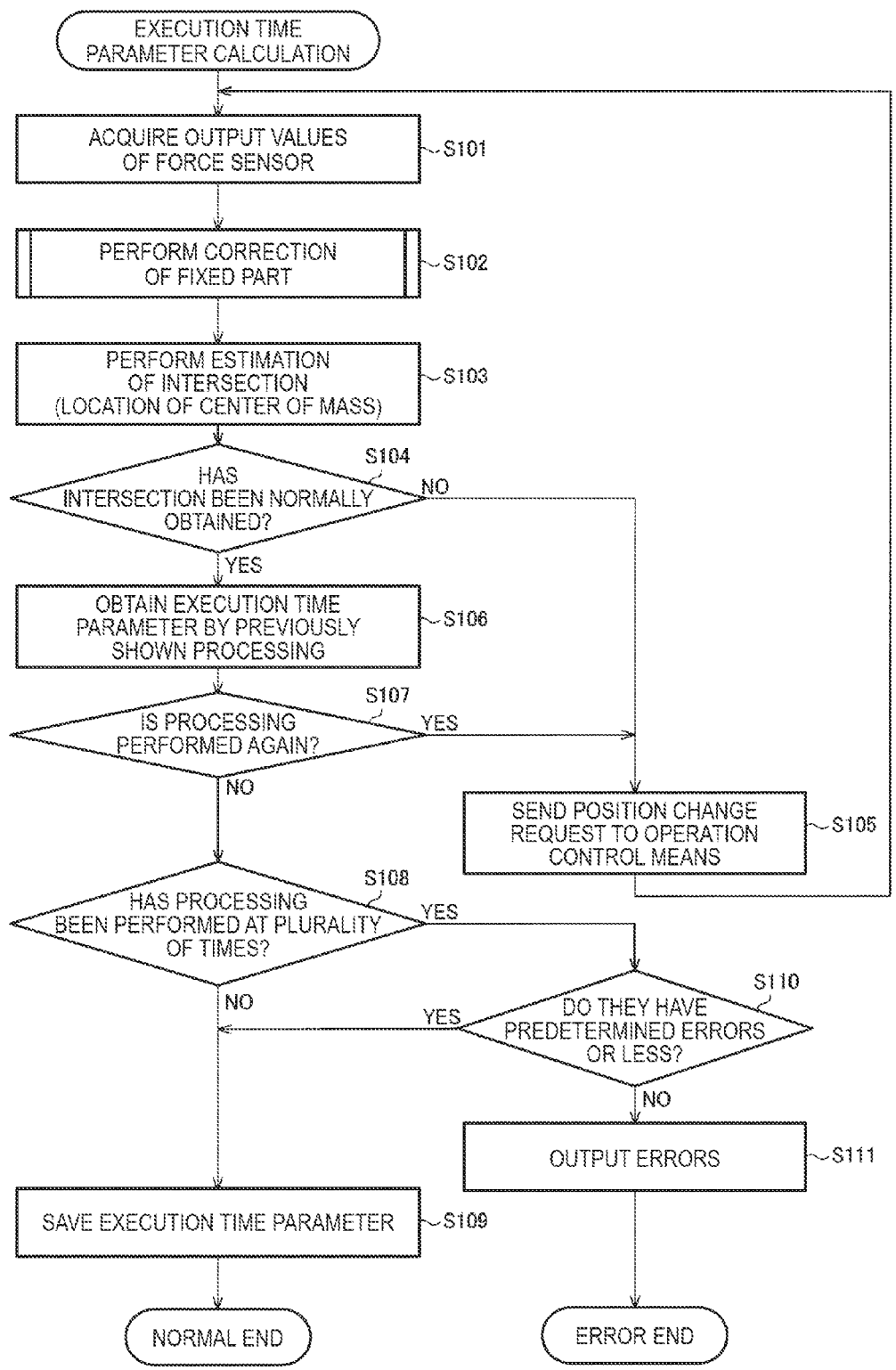
FIG. 22 is a flowchart for explanation of processing in the first embodiment.
Figure 24:
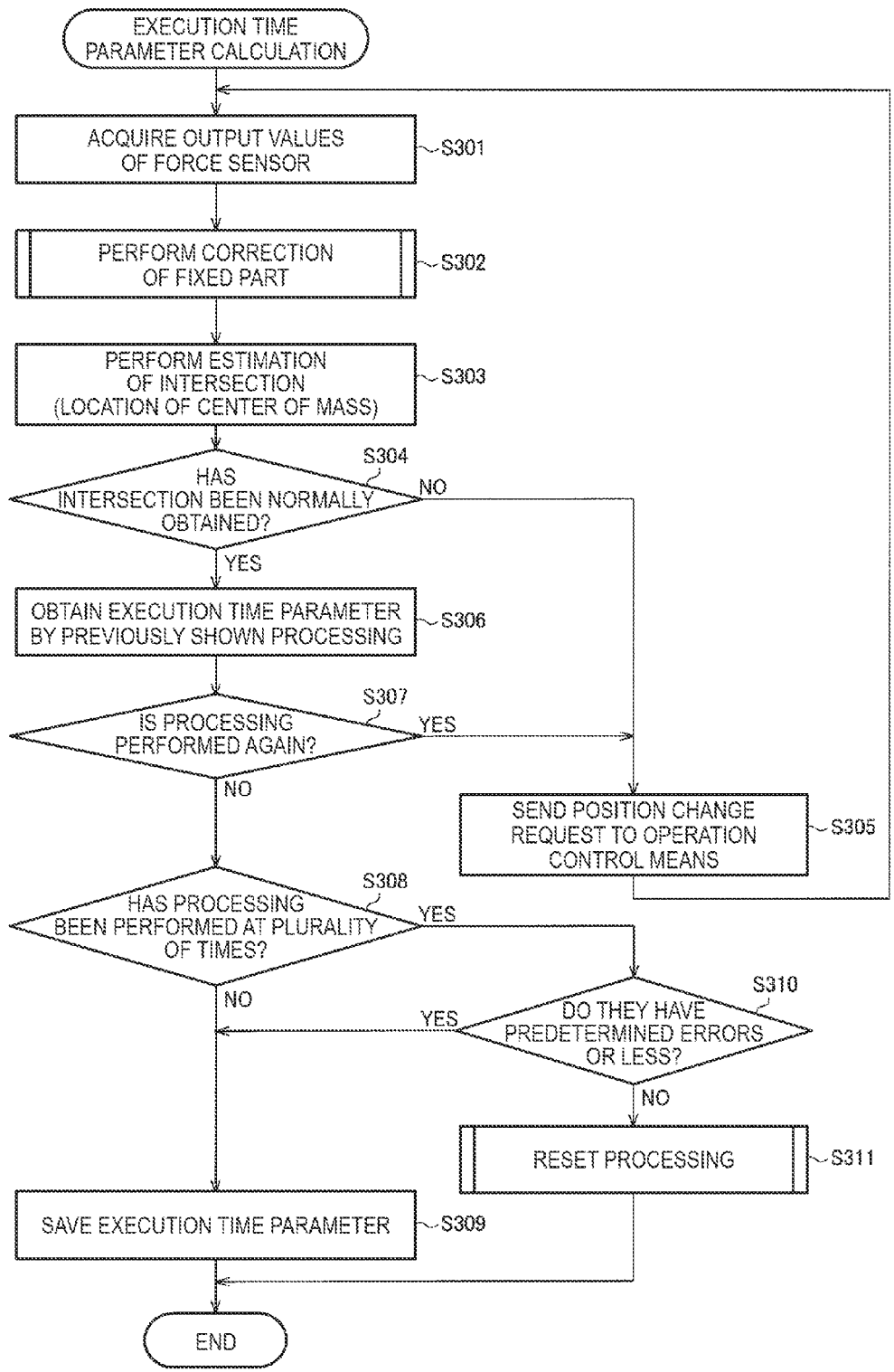
FIG. 24 is a flowchart for explanation of processing in the second embodiment.

As is clear from FIG. 24, steps S301 to S310 are the same as those of steps S101 to S110 in FIG. 22, and the detailed explanation will be omitted. That is, in the embodiment, whether or not the physical modeling of the end effector 12 is possible is still unknown, and estimation processing is attempted. The details of the estimation processing are the same as those of the first embodiment, and the detailed explanation will be omitted. In this regard, if the estimation processing is performed only once, i.e., the number of acquired execution time parameter is only one, the determination as to whether or not the physical model represented by the execution time parameter is appropriate (if it is possible to use the physical model as one representing the end effector 12 under a wide range of conditions) is difficult. Therefore, in practice, it is assumed that estimation processing is performed at a plurality of times, and a determination as to whether or not the resulting execution time parameters have predetermined errors or less is made (step S310). Accordingly, in the processing of the embodiment, step S308 in FIG. 24 may be omitted and the process may inevitably move to step S310 after the processing at step S307.

At step S310, if the execution time parameter has the predetermined error or less, the end effector 12 is appropriately represented by the estimated physical model, and thus, the execution time parameter at this time may be stored as is the case of the first embodiment (step S309) and the correction processing based on the physical model may be performed.

On the other hand, if the execution time parameter has an error more than the predetermined error at step S310, a determination that the physical modeling of the end effector 12 is difficult is made as shown in FIGS. 5A and 5B. This is because, as described above, the physical model representing the end effector 12 may frequently change due to the degrees of stretch of the cable, the friction between the cable and the floor or the like in FIG. 5A and changes of relative locational relationships between A1 and A2 or the like in FIG. 5B. That is, if the physical modeling of the end effector 12 is possible, as described above in the first embodiment, it is assumed that the obtained execution time parameters have predetermined errors or less, and, on the other hand, in the case where the physical modeling of the end effector 12 is difficult, even if the sensors or the like have no error, the obtained execution time parameters may change depending on the conditions. Accordingly, if the obtained execution time parameters largely vary, a determination that the end effector 12 itself is not appropriate for the physical modeling is made.

Figure 25:
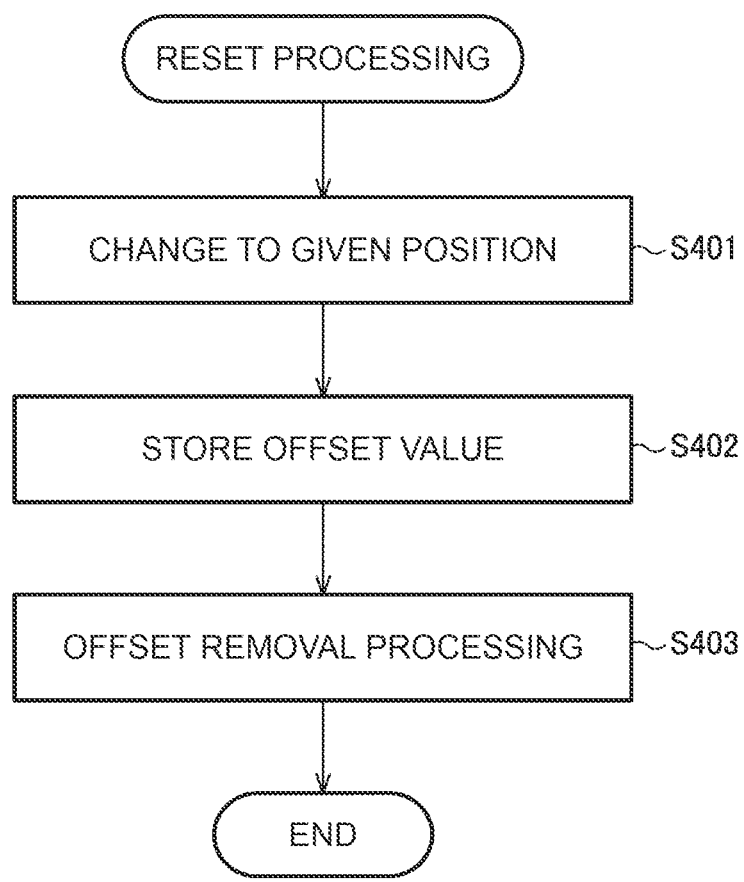
FIG. 25 is a flowchart for explanation of reset processing.

That is, if No at step S310, physical modeling of the end effector 12 may be abandoned, and the reset processing of the related art may be performed (step S311). The details of the reset processing are shown in a flowchart of FIG. 25. When the reset processing is started, first, a command is issued to the controller 110 so that the same position as that at work may be taken (step S401). If the same position as that at work is taken, but no force is applied unlike the actual work, the value detected as the force sense value (offset value) represents the force acting on the force sensor due to the end effector 12 and the value should not change at work. That is, it is unnecessary that the position of the entire robot 10 is the same as that at work, but may be the position having the offset value sufficiently closer to the value at work.

Then, if the position change is performed by the controller 110 according to the command, the force sense value after the position change is stored as the offset value (step S402). Then, after step S402 before the end of work, offset removal processing of removing the offset value from the force sense values acquired from the force sensor 20 is performed (step S403).

5. Third Embodiment

In the third embodiment, the case where the end effector 12 includes the variable part as shown in FIGS. 6A to 6C will be explained. In the embodiment, the case where it is not necessary to consider the tool (12-2 in FIG. 11A or the like) grasped by the hand as the end effector 12, the case where the tool is grasped but the grasp location is fixed, or the like is assumed, and the case where the physical model is unknown or the case where the estimation is impossible in the first place is not assumed. That is, in the embodiment, although the shape, mass, etc. of the end effector 12 are known, the situation that the physical model of the end effector 12 changes due to changes of the finger joint angles as shown in FIG. 6B, for example, or the like is considered to be problematic.

5.1 System Configuration Example

Figure 26:
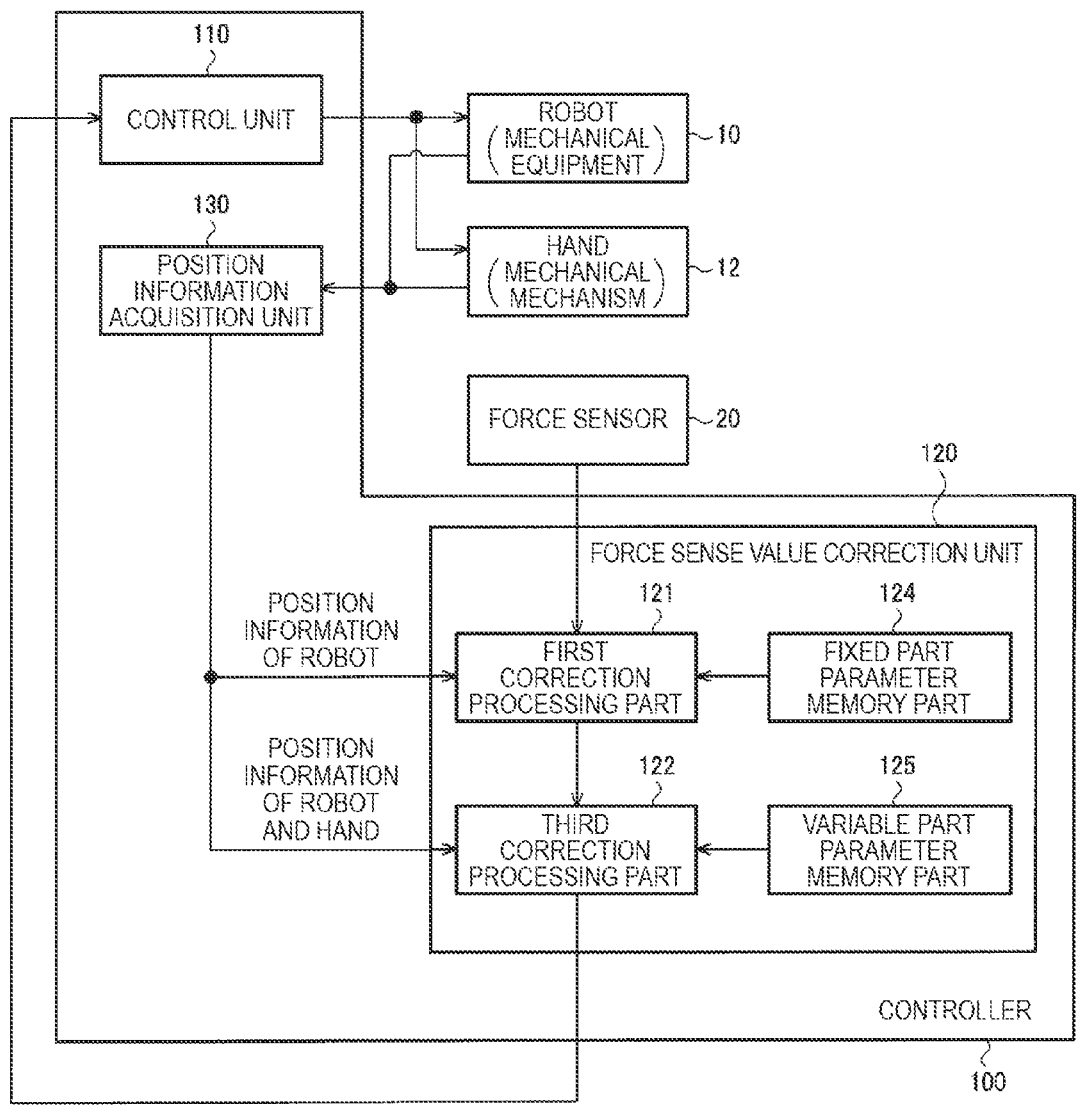
FIG. 26 shows a system configuration example of the third embodiment.

FIG. 26 shows a system configuration example of the embodiment. Compared to the first embodiment, the second correction processing part 123, the execution time parameter calculation part 126, and the execution time parameter memory part 127 of the force sense value corrector 120 are removed and a third correction processing part 122 and a variable part parameter memory part 125 are added.

The fixed part parameter memory part 124 stores the fixed part parameter corresponding to the physical model of the fixed part (the palm part 12-3 in FIG. 27 or the like) of the end effector 12. Further, the first correction processing part 121 performs force sense value correction processing with respect to the fixed part based on the fixed part parameter and the position information of the robot from the position information acquirer 130.

The variable part parameter memory part 125 stores a variable part parameter corresponding to the physical model of the variable part (the finger part 12-4 in FIG. 27 or the like) of the end effector 12. Further, the third correction processing part 122 performs force sense value correction processing with respect to the variable part based on the variable part parameter, the position information of the robot from the position information acquirer 130, and the position information from the end effector 12.

5.2 Details of Correction Processing on Variable Part

As has been described in the first embodiment as the correction processing of the fixed part, in the case where the coordinate system 1 with the origin in the location of the center of mass is also set for the variable part, if it is possible to obtain the translation vector t and the rotation matrix R from the sensor coordinate system (coordinate system 2) to the coordinate system 1, the correction processing of the force sense values becomes possible.

Figure 28B:
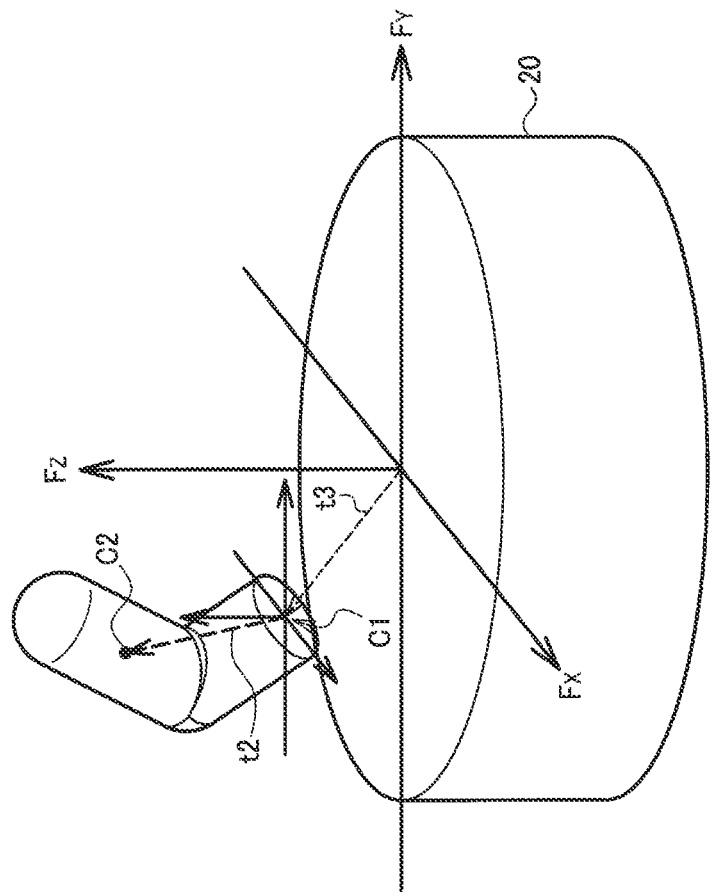
FIGS. 28A and 28B are diagrams for explanation of processing on the variable part.
Figure 28A:
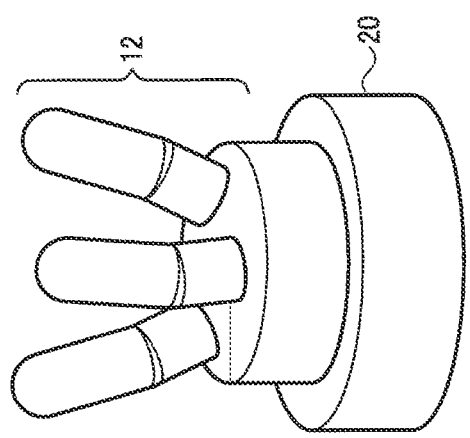
Figure 29:
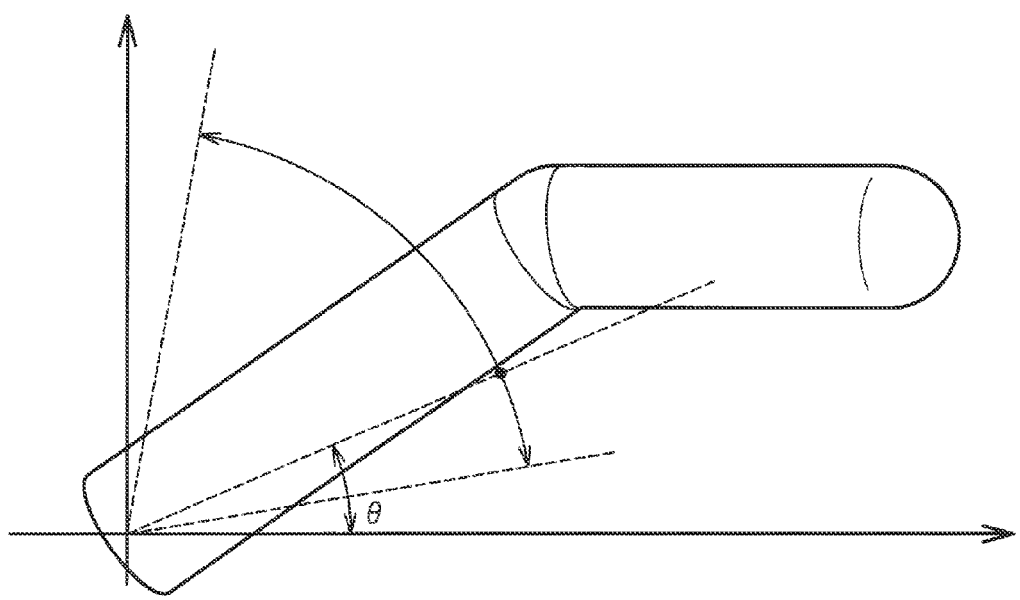
FIG. 29 is an explanatory diagram of position information of the variable part.

Here, for simplification of the explanation, as shown in FIG. 28B, the force sensor 20 and only one finger structure in FIG. 28A are considered. Further, as shown in FIG. 29, it is assumed that the finger structure is a structure rotatable around the X-axis with the rotation angle θ at the origin of a finger rotation coordinate system (C1 in FIG. 28B). That is, here, no joint is provided in the other parts of the finger structure.

In this case, the physical model of the finger structure itself is known, and a translation vector t2 from the origin of the finger rotation coordinate system to the location of the center of mass (C2 in FIG. 28B) and the mass m are stored as variable part parameters in advance. Further, the origin C1 of the finger rotation coordinate system is in the joint part (i.e., the rotation axis when the rotation angle θ is specified), and the location relative to the origin of the sensor coordinate system is unchanged and a translation vector t3 from the origin of the sensor coordinate system to C1 is also stored as a known variable part parameter. Furthermore, the rotation between the sensor coordinate system and the finger rotation coordinate system is unknown if the fact that the finger rotation coordinate system rotates in response to the value of θ is considered. However, if θ takes a given reference value, the roll angle, the pitch angle, and the yaw angle (u,v,w) between the coordinate systems are known and also stored as the variable part parameters.

That is, if only the parameter θ representing the movement of the variable part is determined, a displacement vector representing the location of the center of mass in the sensor coordinate system (a vector from the origin of the sensor coordinate system to the location of the center of mass) may be obtained from θ, t2, t3, u, v, w, and the displacement vector is the translation vector t shown in FIG. 13 or the like. As an example, it is considered that coordinate conversion is performed on the translation vector t2 based on the rotation matrix expressed by θ and u, v, w, the vector is converted into a vector in the sensor coordinate system, and a vector sum of the converted vector and t3 is obtained. Further, generally, the vector may be obtained as elements of a 4×4 homogeneous matrix and, in this case, there is an advantage that both translation and rotation may be processed using the matrix.

As described above, the translation vector t (corresponding to the location of the center of mass of x, y, z) with reference to the sensor coordinate system may be obtained from the variable part parameters (t2, t3, u, v, w) and the position information of the end effector 12 (θ), and the known value may be used for the mass m. That is, the values corresponding to the fixed part parameters may be also calculated with respect to the variable part, and thus, in the subsequent processing, as described above in the first embodiment, F' and M' may be obtained based on the equation (2) and the obtained values of F' and M' may be removed from the force sense values. In this manner, the influence on the force sense values by the variable part may be suppressed.

Figure 30A:
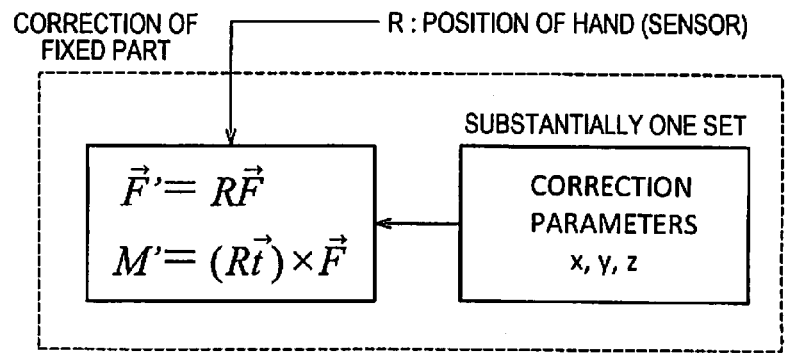
Figure 30B:
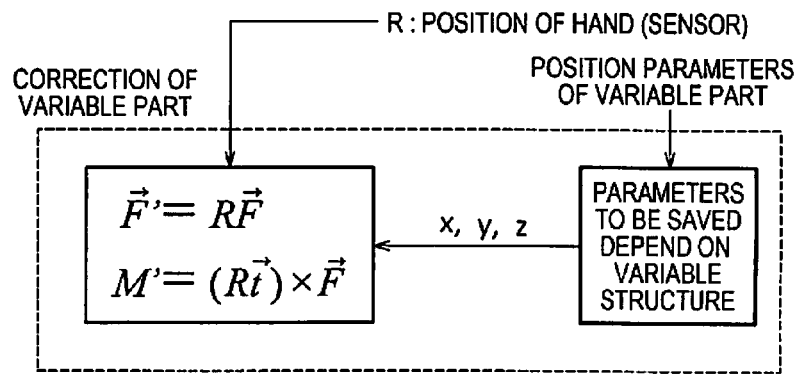
Figure 30C:
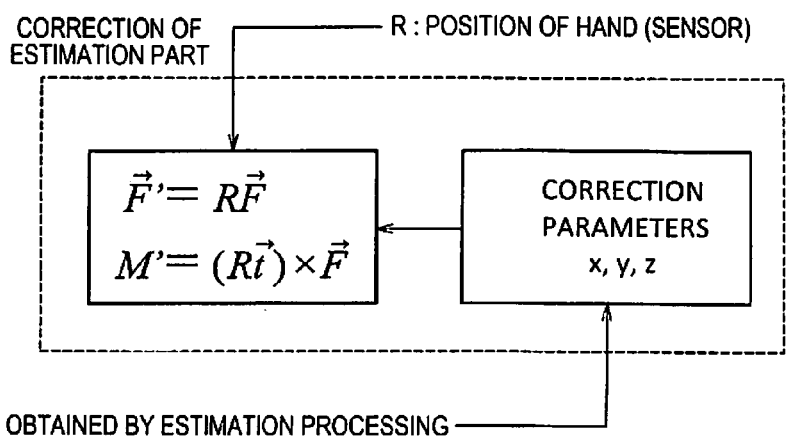

The above processing is summarized in FIGS. 30A to 30C. Regarding the fixed part described above in the first embodiment, as shown in FIG. 30A, (x,y,z) are stored as the fixed part parameters and, if the rotation matrix R is obtained based on the position information of the robot 10, an amount of fixed part correction may be obtained, and thereby, the correction processing becomes possible. On the other hand, regarding the variable part, as shown in FIG. 30B, (t2,t3,u,v,w) are stored as has been described as examples of the variable part parameters, and (x,y,z), are obtained based on the variable part parameters and the position information θ of the end effector 12 (the variable part in a narrower sense). Then, an amount of variable part correction is obtained from the obtained (x,y,z,) and the rotation matrix R and the correction processing is performed.

Further, in the case where the estimation processing shown in the first embodiment is performed, the parameters are not stored in advance, but (x,y,z) are estimated based on the force sense values as shown in FIG. 30C. After the estimation result is obtained, as is the case of the fixed part, an amount of correction is obtained from the rotation matrix R and the correction processing is performed.

5.3 Details of Processing

Figure 31:
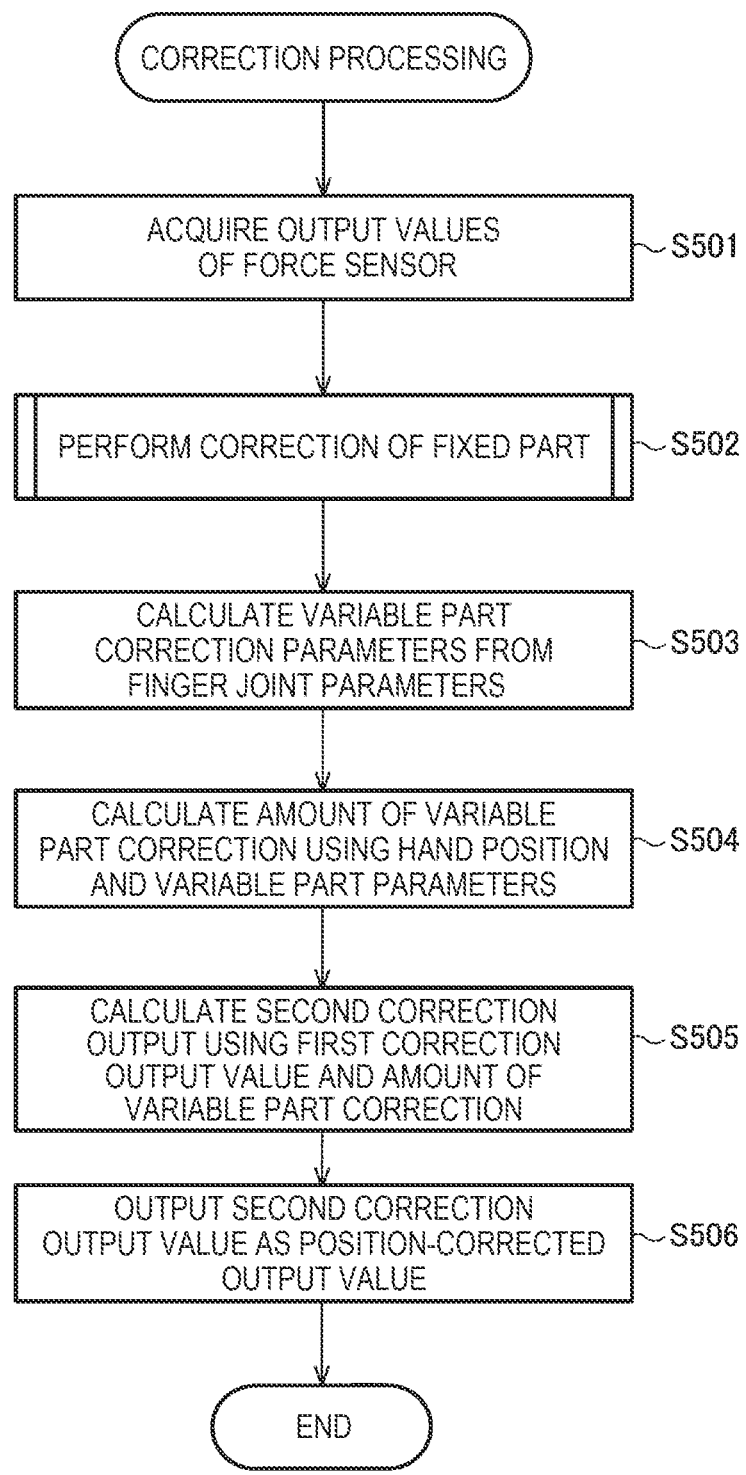
FIG. 31 is a flowchart for explanation of processing in the third embodiment.

The correction processing of the embodiment will be explained using a flowchart in FIG. 31. When the processing is started, output values (force sense values before correction processing) from the force sensor 20 are acquired (step S501). Then, correction processing corresponding to the fixed part is performed on the acquired force sense values (step S502).

The correction processing of the fixed part at step S502 is the same as that in FIG. 23 explained in the first embodiment, and the detailed explanation will be omitted. Then, correction parameters (t=(x,y,z) and m in the example) are obtained based on the variable part parameters (t2, t3, u, v, w in the example) and the finger joint parameters (θ in the example) (step S503). Then, the amount of variable part correction is calculated based on the obtained correction parameters and the position of the robot 10 (step S504). The processing at step S504 corresponds to the processing of obtaining R based on the position information of the robot 10 and obtaining F' and M' using the equation (2) in the example.

Then, the correction processing using the amount of variable part correction obtained at step S504 is performed on the force sense values after the fixed part correction processing as the output at step S502 (step S505), and the results are output as force sense values after the correction processing (step S506). The output at step S506 has been subjected to correction processing for both the fixed part and the variable part, and the force sense values are obtained from the correction processing on the entire end effector 12.

In the above described embodiment, as shown in FIG. 26, the control system may include the position information acquirer 130 that acquires the position information of the variable part of the robot 10 (for example, the finger structures shown by 12-4 in FIG. 27). Further, the force sense value corrector 120 estimates the location of the center of mass of the variable part and performs correction processing based on the position information of the variable part.

Thereby, even in the case where the end effector 12 includes the variable part and the physical model of the entire end effector 12 changes, appropriate correction processing may be performed. Specifically, the variable part parameters such as (t2,t3,u,v,w) are held and the location of the center of mass (x,y,z) is estimated from the variable part parameters and the position information (θ) of the variable part. If the location of the center of mass and the mass are obtained, then, as shown in FIGS. 30A and 30B, correction may be performed by the same processing as that for the fixed part.

6. Fourth Embodiment

The techniques explained in the first to third embodiments are not limited to independent use, but some of them may be combined. Here, as shown in FIG. 4A, the case where the tool is grasped by the hand having the variable finger structures and the grasp location of the tool has a degree of freedom, and further, the case where the tool to be grasped includes a candidate that is difficult to be physically modeled as shown in FIG. 5A or the like are considered. In the cases, it is desirable to use the technique explained in the third embodiment because the end effector 12 has the variable part and the estimation technique explained in the first embodiment because the physical model is unknown. Furthermore, it is likely that the physical modeling itself is impossible, and the technique of the second embodiment of determining whether or not estimation is possible may be used.

6.1 System Configuration Example

Figure 32:
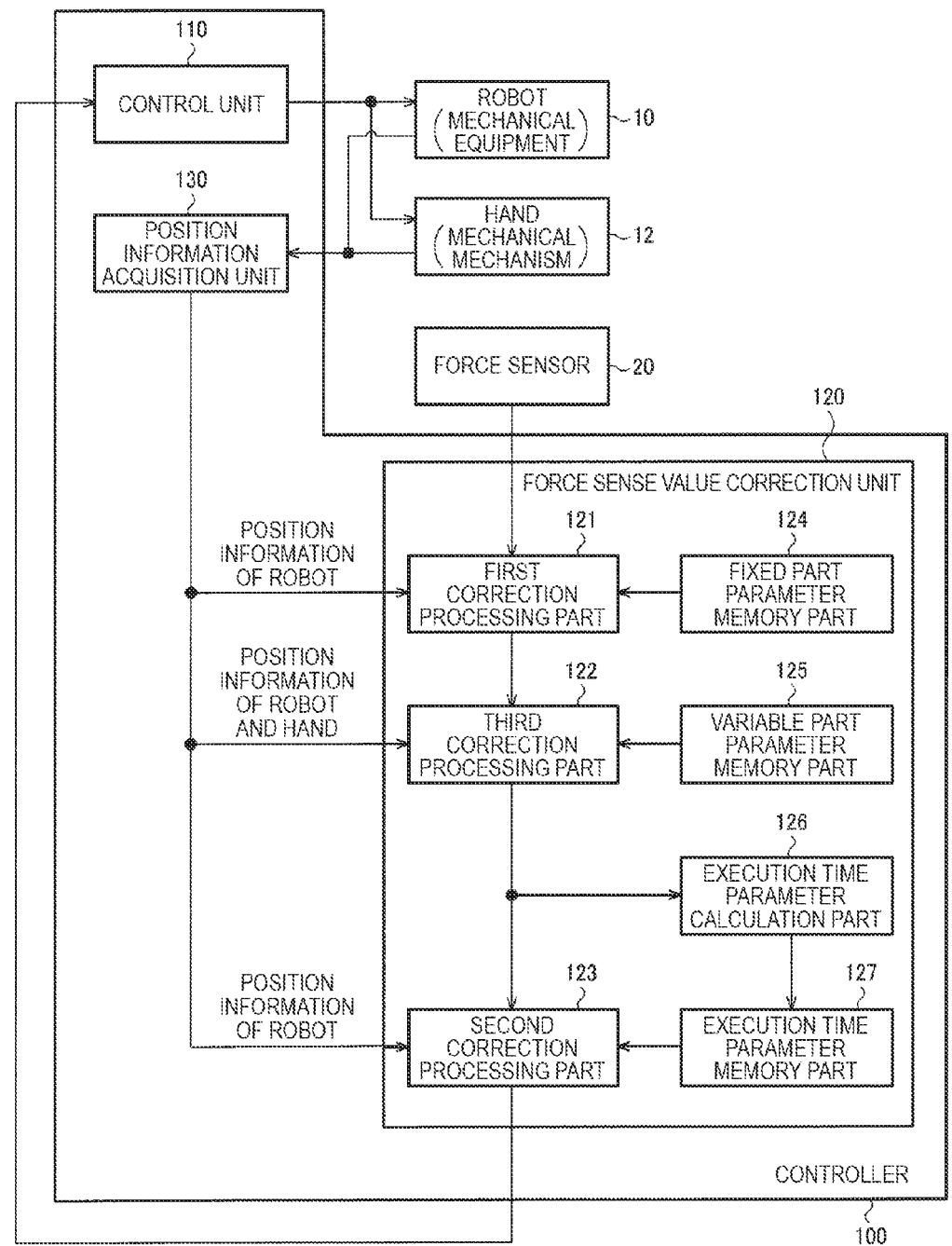
FIG. 32 shows a system configuration example of the fourth embodiment.

FIG. 32 shows a system configuration example of the embodiment. As shown in FIG. 32, the force sense value corrector 120 of the control system includes the respective parts shown in FIGS. 12 and 26. Note that, though not illustrated in FIG. 26, the force sense value corrector 120 may have a position change command part of commanding position change to the controller 110 based on the calculation result in the execution time parameter calculation part 126. The position change command part may be included in the force sense value corrector 120 in FIG. 12 as has been described in the first embodiment.

The first correction processing part 121 is connected to the third correction processing part 122. The third correction processing part 122 is connected to the second correction processing part 123 and the execution time parameter calculation part 126. The execution time parameter calculation part 126 is connected to the execution time parameter memory part 127.

When the force sense value corrector 120 includes the position change command part, the position change command part commands position change of the robot 100 to the controller 110 based on the result of the calculation processing in the execution time parameter calculation part 126. Specifically, in the case where the determination that the estimated intersection (the location of the center of mass) is inappropriate is made, it is desired that the execution time parameter in the position different from that of the calculated execution time parameter (including the estimated intersection) is obtained, or the like, the position change command part commands position change of the robot 100 to the controller 110.

6.2 Details of Processing

Figure 33:
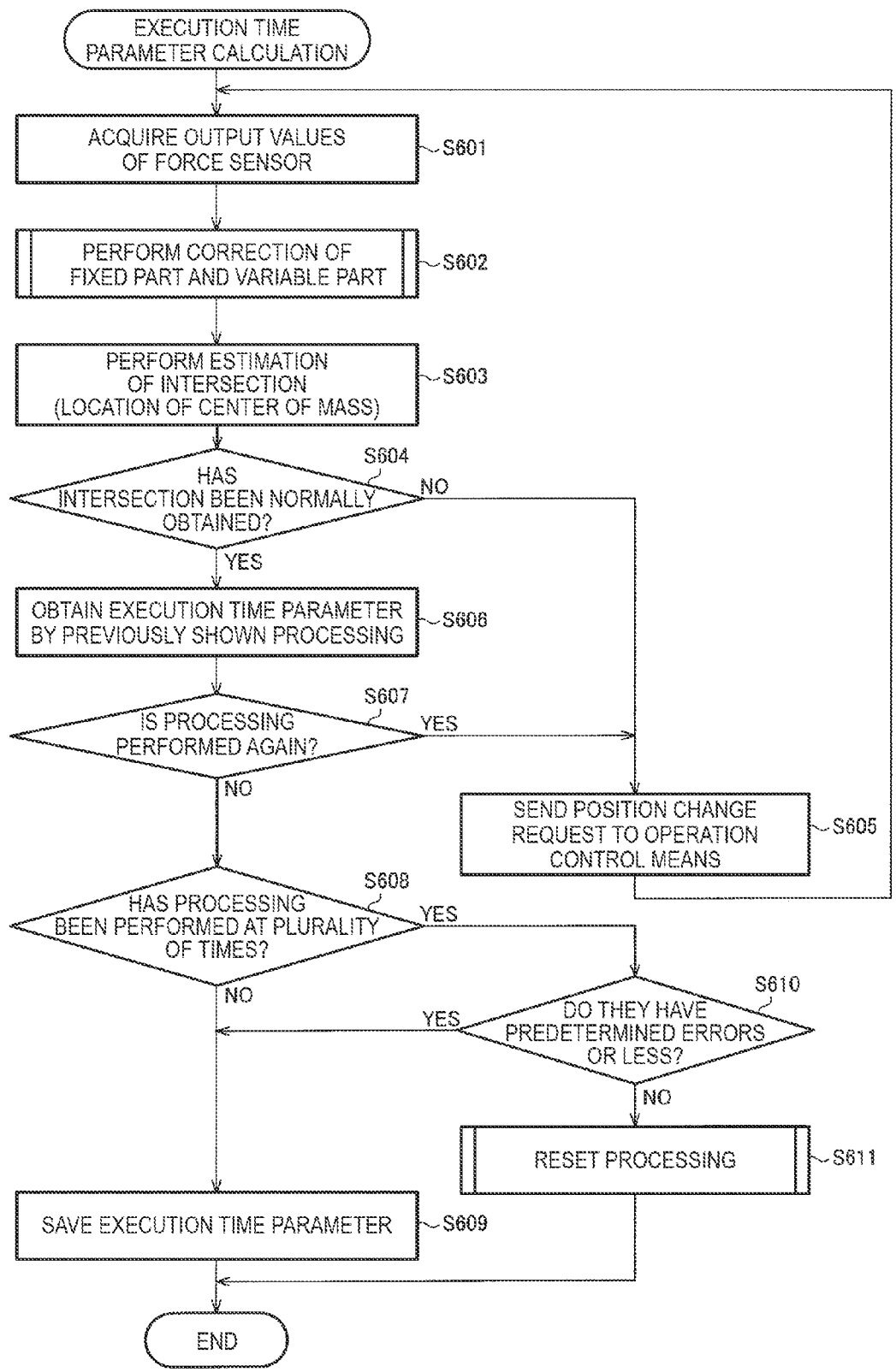
FIG. 33 is a flowchart for explanation of processing in the fourth embodiment.

The correction processing of the embodiment will be explained using a flowchart in FIG. 33. When the processing is started, output values (force sense values before correction processing) from the force sensor 20 are acquired (step S601). Then, correction processing corresponding to the fixed part and the variable part is performed on the acquired force sense values (step S602). The correction processing of the fixed part at step S602 is the same as that in FIG. 23 explained in the first embodiment, and the detailed explanation will be omitted. Further, the correction processing of the variable part is the same as that at steps S503 to S506 in FIG. 31 explained in the third embodiment.

The subsequent steps S603 to S611 are the same as steps S303 to S311 in FIG. 24 explained in the second embodiment. That is, as an example of the processing procedure of the embodiment combining the first to third embodiments, first, correction processing on the fixed part and the variable part is performed, and estimation processing is performed based on the force sense values after the correction processing. Then, from the result of the estimation processing, whether or not the physical modeling of the end effector 12 is possible is determined, if the physical modeling is possible, correction processing is performed using the estimation result. On the other hand, if the physical modeling is impossible, the correction processing using the physical modeling is abandoned and the correction processing is performed by reset processing.

The four embodiments 1 to 4 to which the invention is applied and their modified examples have been explained above, however, the invention is not limited to the respective embodiments 1 to 4 and their modified examples as they are and the component elements may be modified and embodied without departing from the scope of the invention. Further, some of the component elements disclosed in the above described respective embodiments 1 to 4 and the modified examples may be appropriately combined to form various inventions. For example, some of the component elements may be removed from all component elements described in the respective embodiments 1 to 4 and the modified examples. Furthermore, the component elements explained in the other embodiments and modified examples may be appropriately combined. In addition, in the specifications and drawings, the terms described with the broader or synonymous different terms at least once may be replaced by the different terms in any part of the specification or the drawings. As described above, various modifications and application may be made without departing from the scope of the invention.

The entire disclosure of Japanese Patent Application No. 2012-161732 filed Jul. 20, 2012 is expressly incorporated by reference herein.

What is claimed is:

1. A control system comprising:
a mechanical mechanism;
a force sensor that outputs force sense values; and
a controller that includes a force sense value corrector, the force sense value corrector corrects the force sense values outputted based on the force sense values from the force sensor and on position information of a mechanical equipment, wherein the controller performs control of the mechanical equipment including the mechanical mechanism based on the force sense values corrected by the force sense value corrector, wherein
the force sensor has N triaxial force sensor units, N is an integer equal to or more than two,
the force sensor acquires unit output values to which values resulting from the mechanical mechanism have been added from the respective triaxial force sensor units of the N triaxial force sensor units and outputs force sense values based on the unit output values,
the force sensor outputs information containing the unit output values from the respective triaxial force sensor units of the N triaxial force sensor units as the force sense values,
the force sense value corrector estimates a location of a center of mass of the mechanical mechanism based on the unit output values contained in the force sense values, and performs the correction processing based on the estimated location of the center of mass, and
the force sense value corrector estimates the location of the center of mass by obtaining a least squares solution of the location of the center of mass of the mechanical mechanism using a normalization equation.

2. The control system according to claim 1, wherein the force sense value corrector obtains N force vectors corresponding to forces respectively detected by the N triaxial force sensor units from the unit output values contained in the force sense values, estimates a mass of the mechanical mechanism based on a magnitude of a resultant vector of the obtained N force vectors, and performs the correction processing based on the estimated mass.

3. The control system according to claim 1, wherein the force sensor has three or more triaxial force sensor units.

4. The control system according to claim 1, wherein the force sensor has four or more triaxial force sensor units.

5. The control system according to claim 1, wherein:
the force sense value corrector performs processing of estimating the location of the center of mass of the mechanical mechanism according to first force sense values output from the force sensor based on the unit output values from the N triaxial force sensor units in a first position of the mechanical equipment,
the controller performs control of changing the position of the mechanical equipment to a second position different from the first position if a determination that the estimation of the location of the center of mass is impossible has been made by the force sense value corrector, and
after the controller controls the mechanical equipment to be in the second position, the force sense value corrector estimates the location of the center of mass of the mechanical mechanism according to second force sense values from the force sensor based on the unit output values from the N triaxial force sensor units, and performs the correction processing based on the estimated location of the center of mass.

6. The control system according to claim 1, wherein the force sense value corrector performs singular value decomposition on the normalization equation, and determines whether the estimation of the location of the center of mass is possible based on the number of singular values obtained by the singular value decomposition.

7. The control system according to claim 1, wherein:
the force sensor is a six-axial force sensor that acquires three values as the unit output values from each of the N triaxial force sensor units, and thereby, acquires 3×N values, calculates translational forces Fx, Fy, Fz of X-axis, Y-axis, and Z-axis and moment Mx, My, Mz around the respective axes based on the acquired 3×N values, and outputs information containing the calculated Fx, Fy, Fz and Mx, My, Mz as the force sense values.

8. The control system according to claim 1, wherein the force sense value corrector performs the correction processing based on a plurality of the force sense values obtained in a plurality of the positions of the mechanical equipment.

9. The control system according to claim 1, further comprising a position information acquirer that acquires position information of a variable part of the mechanical mechanism,
wherein the force sense value corrector estimates the location of the center of mass of the variable part and performs the correction processing based on the position information of the variable part.

10. The control system according to claim 1, wherein
the mechanical equipment is a robot,
the mechanical mechanism is an end effector of the robot,
the force sense value corrector acquires the force sense values from the force sensor provided in correspondence with the end effector of the robot, and performs correction processing of the acquired force sense values, and
the controller performs control of the robot and the end effector based on the force sense values after the correction processing.

11. A program causing a computer to function as:
a controller that includes a force sense value corrector, the force sense value corrector acquires force sense values from a force sensor provided in correspondence with a mechanical mechanism of mechanical equipment, wherein:
the force sense values includes information containing unit output values acquired by the force sensor,
the force sense value corrector estimates a location of a center of mass of the mechanical mechanism based on the unit output values contained in the force sense values by obtaining a least squares solution of the location of the center of mass of the mechanical mechanism using a normalization equation,
the force sense value corrector performs the correction processing based on the estimated location of the center of mass, and
the controller performs control of the mechanical equipment and the mechanical mechanism based on the force sense values after the correction processing.

12. A method of controlling mechanical equipment comprising:
acquiring force sense values from a force sensor provided in correspondence with a mechanical mechanism of the mechanical equipment, wherein the force sensor has N triaxial force sensor units, N is an integer equal to or more than two, the force sensor acquires unit output values to which values resulting from the mechanical mechanism have been added from the respective triaxial force sensor units of the N triaxial force sensor units and outputs force sense values based on the unit output values, the force sense values include information containing the unit output values output from the respective triaxial force sensor units of the N triaxial force sensor units;
estimating a location of a center of mass of the mechanical mechanism based on the unit output values of the force sense values, wherein the location of the center of mass is estimated by obtaining a least squares solution of the location of the center of mass of the mechanical mechanism using a normalization equation;
performing correction processing on the acquired force sense values based on the estimated location of the center of mass; and
performing control of the mechanical equipment and the mechanical mechanism based on the force sense values after the correction processing.

* * * * *